(12) United States Patent
Powell

(10) Patent No.: US 11,603,160 B2
(45) Date of Patent: Mar. 14, 2023

(54) UNDER-AXLE STEERING ASSEMBLY

(71) Applicant: Wayne Powell, Balboa, CA (US)

(72) Inventor: Wayne Powell, Balboa, CA (US)

( * ) Notice: Subject to any disclaimer, the term of this patent is extended or adjusted under 35 U.S.C. 154(b) by 570 days.

(21) Appl. No.: 15/777,013

(22) PCT Filed: Nov. 20, 2016

(86) PCT No.: PCT/US2016/062975
§ 371 (c)(1),
(2) Date: May 17, 2018

(87) PCT Pub. No.: WO2017/087922
PCT Pub. Date: May 26, 2017

(65) Prior Publication Data
US 2018/0327047 A1    Nov. 15, 2018

Related U.S. Application Data

(60) Provisional application No. 62/258,366, filed on Nov. 20, 2015.

(51) Int. Cl.
*B62K 25/02* (2006.01)
*B62K 3/00* (2006.01)
(Continued)

(52) U.S. Cl.
CPC ............... *B62K 21/18* (2013.01); *B62H 1/12* (2013.01); *B62K 3/002* (2013.01); *B62K 21/00* (2013.01);
(Continued)

(58) Field of Classification Search
CPC ........ B62K 21/18; B62K 21/20; B62K 21/22; B62K 21/00; B62K 19/32; B62K 3/002;
(Continued)

(56) References Cited

U.S. PATENT DOCUMENTS

| 833,651 A | 10/1906 | Tooley |
| 1,183,938 A * | 5/1916 | White ................... B62K 21/00 |
| | | 280/270 |

(Continued)

FOREIGN PATENT DOCUMENTS

| CN | 2868831 Y | 2/2007 |
| CN | 203078637 U | 7/2013 |

(Continued)

OTHER PUBLICATIONS

Translation of WO88/07467 to Carn (Year: 1988).*

*Primary Examiner* — Anne Marie M Boehler
(74) *Attorney, Agent, or Firm* — Total Awareness Consulting Services; Robert Winslow

(57) ABSTRACT

A first steer tube has a first upper side and a first lower side. A second steer tube has a second upper side and a second lower side. A first axle mounting structure is configured to connect the first lower side to a first end of an axle assembly of a wheel. A second axle mounting structure is configured to connect the second lower side to a second end of the axle assembly. A first head tube assembly is disposed to the first lower side. A second head tube assembly is disposed to the second lower side. A support structure includes a first pivot connection and a second pivot connection. A first arm connects the first head tube assembly and the first pivot connection. A second arm connects the second head tube assembly and the second pivot connection.

14 Claims, 19 Drawing Sheets

(51) Int. Cl.
   *B62K 21/00*   (2006.01)
   *B62K 21/22*   (2006.01)
   *B62H 1/12*    (2006.01)
   *B62K 21/18*   (2006.01)
   *B62K 25/04*   (2006.01)

(52) U.S. Cl.
   CPC .............. *B62K 21/22* (2013.01); *B62K 25/02* (2013.01); *B62K 25/04* (2013.01)

(58) Field of Classification Search
   CPC ........ B62K 3/005; B62K 25/02; B62K 25/04; B62K 25/24; B62K 21/005; B62K 5/10; B62H 1/12; B62D 61/08
   USPC ............... 280/276, 279, 270, 288.1, 92, 263
   See application file for complete search history.

(56) References Cited

U.S. PATENT DOCUMENTS

| | | | |
|---|---|---|---|
| 1,715,246 A | | 5/1929 | Osborn et al. |
| 3,539,196 A | * | 11/1970 | Fleming ................. B62D 61/06 280/92 |
| 3,955,828 A | * | 5/1976 | Boudreau .............. B62K 21/22 280/279 |
| 4,281,844 A | | 8/1981 | Jackman et al. |
| 4,480,847 A | * | 11/1984 | Oyama .................. B62K 3/005 280/270 |
| 4,703,824 A | * | 11/1987 | Irimajiri ............... B62D 61/065 180/210 |
| 4,993,733 A | | 2/1991 | Eilers |
| 6,042,134 A | * | 3/2000 | Rector ................... B62K 3/005 280/263 |
| 6,517,092 B2 | | 2/2003 | Humphrey |
| 7,059,619 B2 | * | 6/2006 | Dom ...................... B62K 25/00 180/219 |
| 8,240,686 B2 | | 8/2012 | Choi |
| 2004/0227317 A1 | * | 11/2004 | Cheng ................... B62K 25/16 280/87.041 |
| 2006/0076752 A1 | | 4/2006 | Montague et al. |
| 2015/0069732 A1 | | 3/2015 | Godlewski |
| 2019/0071147 A1 | * | 3/2019 | Minaker ............... B62K 25/24 |

FOREIGN PATENT DOCUMENTS

| | | | | |
|---|---|---|---|---|
| CN | 203473120 U | | 3/2014 | |
| CN | 203727570 U | | 7/2014 | |
| CN | 104176178 A | | 12/2014 | |
| CN | 204250270 U | | 4/2015 | |
| EP | 0514997 A1 | | 11/1992 | |
| FR | 3004414 A1 | * | 10/2014 | ............. B62K 21/00 |
| FR | 3004414 A1 | | 10/2014 | |
| GB | 205134 A | | 10/1923 | |
| JP | H0699872 A | | 4/1994 | |
| WO | WO-8807467 A1 | * | 10/1988 | ............. B62K 3/002 |

* cited by examiner

UNDER-AXLE STEERING ASSEMBLY

CROSS-REFERENCE TO RELATED APPLICATIONS

This application claims the benefit of U.S. Provisional Application No. 62/258,366, filed Nov. 20, 2015, and International Application No. PCT/US2016/062975, filed Nov. 20, 2016, which are hereby incorporated by reference in their entirety.

BACKGROUND

A two-wheeled vehicle equipped with a traditional steering assembly may impose additional gravitational forces acting on the vehicle. Traditional steering assemblies may impose steering instability for a rider of a two-wheeled vehicle.

DETAILED DESCRIPTION OF EMBODIMENTS

Figure 1:
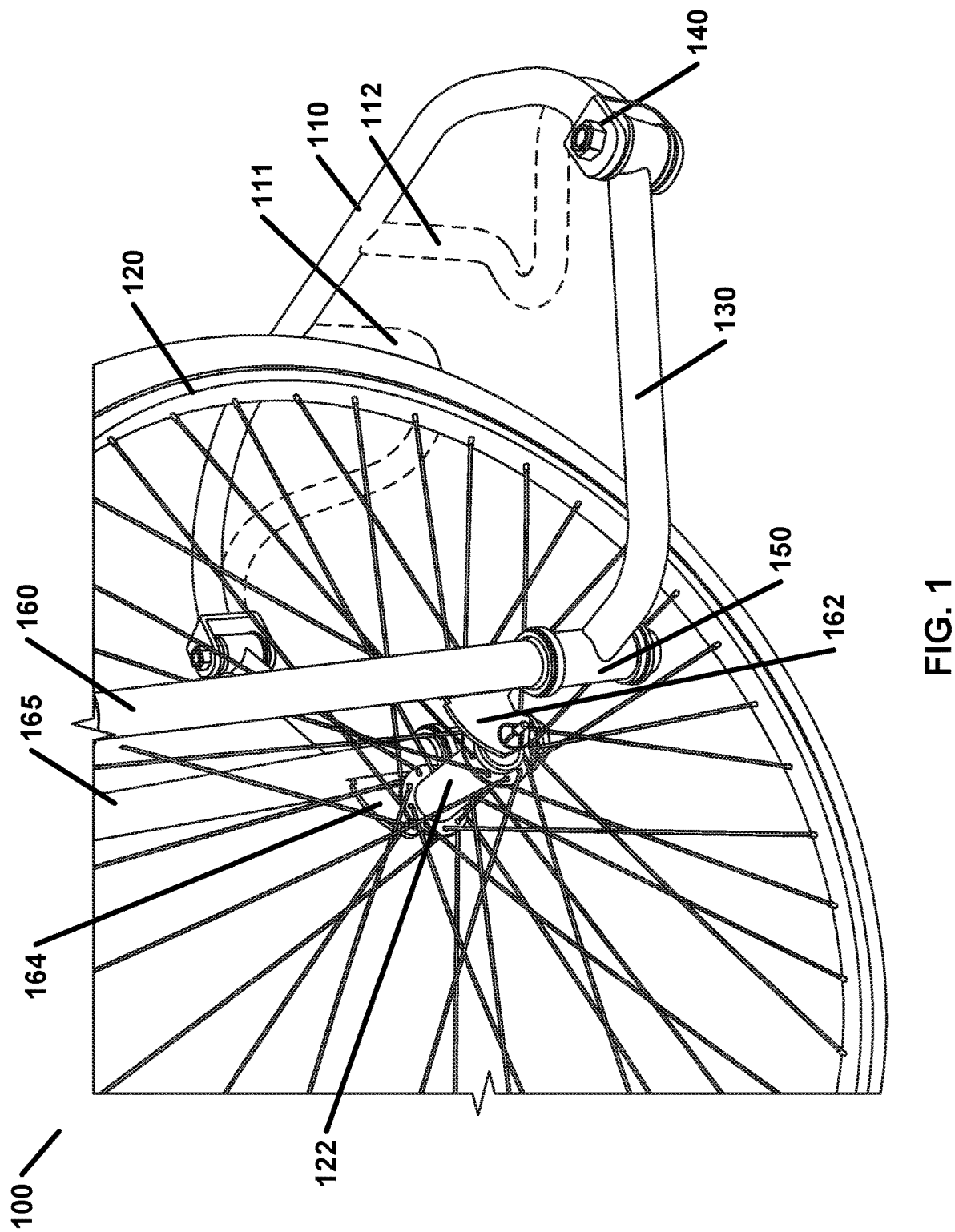
FIG. 1 is an illustration of an example under-axle steering assembly as per various aspects of various embodiments.

Embodiments include an under-axle steering assembly.

Some of the various embodiments may include an apparatus comprising a first steer tube and a second steer tube. A first steer tube may have a first upper side and a first lower side. A second steer tube may have a second upper side and a second lower side. A first upper side and a second upper side may each couple to at least one mechanism configured to at least steer a wheel. The at least one mechanism may comprise a handlebar, a wheel, a tiller, at least one handle, at least one pedal, at least one lever, at least one cable, at least one chain, at least one pulley, combinations thereof, and/or the like. At least one mechanism configured to at least steer a wheel may employ mechanical devices, electric devices, hydraulic devices, combinations thereof, and/or the like. A first steer tube and/or a second steer tube may be configured to connect to at least one brake caliper, a cantilever brake, a rim brake, combinations thereof, and/or the like. A first steer tube and/or a second steer tube may be disposed to a wheel fender. A wheel fender may be connected to the first steer tube and/or the second steer tube through employment of a plurality of fender struts.

According to some of the various embodiments, an apparatus may comprise a first axle mounting structure and a second axle mounting structure. The first axle mounting structure may be configured to connect a first lower side to a first end of an axle assembly of a wheel. The second axle mounting structure may be configured to connect a second lower side to a second end of the axle assembly. The first axle mounting structure and/or the second axle mounting structure may comprise a bracket, a dropout, a through-axle receiving space, combinations thereof, and/or the like. A dropout may be configured to accept an axle. The axle may be solid or hollow. The axle may be configured to be held in place with a threaded fastener on a first end and/or a second end. The axle may be configured to be held in place with a quick-release skewer. A through-axle receiving space may be configured to accept a through-axle. A first steer tube and a second steer tube may be positioned forwards or rearwards of the axle assembly. The axle assembly may be disposed to at least one disc brake.

According to some of the various embodiments, an apparatus may comprise a first head tube assembly disposed to a first lower side, and a second head tube assembly disposed to a second lower side. The first head tube assembly may comprise at least one bearing. The at least one bearing may comprise an upper bearing and a lower bearing. The at least one bearing may comprise at least one sealed bearing. The second head tube assembly may comprise at least one bearing. A bearing race, a star nut, an expansion bolt, a threaded cap, a compression cap, a compression nut, a bolt, a threaded rod, a nut, a c-clip, a ring clip, a cotter pin, combinations thereof, and/or the like may be configured to secure the first lower side in the first head tube assembly. Similarly, a bearing race, a star nut, an expansion bolt, a threaded cap, a compression cap, a compression nut, a threaded rod, a nut, a c-clip, a ring clip, a cotter pin, combinations thereof, and/or the like may be configured to secure the second lower side in the second head tube assembly.

According to some of the various embodiments, an apparatus may comprise a first arm connecting a first head tube assembly and a first pivot connection, and a second arm connecting a second head tube assembly and a second pivot connection. The first arm and/or second arm may be shaped (for example, arced) to accommodate movement of a wheel through a turning radius. The first arm and/or second arm may comprise at least one metal, fiberglass, carbon fiber, at least one composite material, at least one plastic, wood, combinations thereof, and/or the like. The distance between the first pivot connection and the second pivot connection may be between the width of the wheel and the diameter of the wheel. The first pivot connection and/or the second pivot connection may comprise at least one bearing, at least one ball joint, at least one fitting, at least one pin, at least one threaded rod, at least one threaded fastener, at least one threaded joint, at least one washer, at least one rubber bushing, at least one urethane bushing, at least one nylon bushing, at least one elastomer, combinations thereof, and/or the like. At least one bearing may comprise a plurality of ball bearings, at least one sealed bearing, at least one cartridge bearing, combinations thereof, and/or the like.

According to some of the various embodiments, an apparatus may comprise a support structure comprising a first pivot connection and a second pivot connection. The support structure may comprise at least one metal, fiberglass, carbon fiber, at least one composite material, at least one plastic, wood, combinations thereof, and/or the like. The support structure may be at least partially forged. The support structure may be disposed to at least one anti-skid wheel. An anti-skid wheel may be configured to keep the support structure from contacting a riding surface. For example, an anti-skid wheel may be configured to keep the support structure from contacting the ground during an extreme lean angle. An anti-skid wheel may comprise urethane, rubber, steel, combinations thereof, and/or the like FIG. 1 illustrates an example under-axle steering assembly 100 equipped with a wheel (for example 120) pointed mostly straight ahead as per an aspect of various embodiments. Head tube assembly 150 may be disposed to the lower side of a first steer tube 160. Arm 130 may connect head tube assembly 150 and pivot connection 140. Support structure 110 may comprise at least a part of pivot connection 140. Support structure 110 may comprise additional support (for example 111, 112). The lower side of the first steer tube 160 may be connected to a first axle mounting structure 162 configured to accept a first end of an axle assembly 122 of wheel 120. The lower side of a second steer tube 165 may be connected to a second axle mounting structure 164 configured to accept a second end of the axle assembly 122 of wheel 120.

Figure 2:
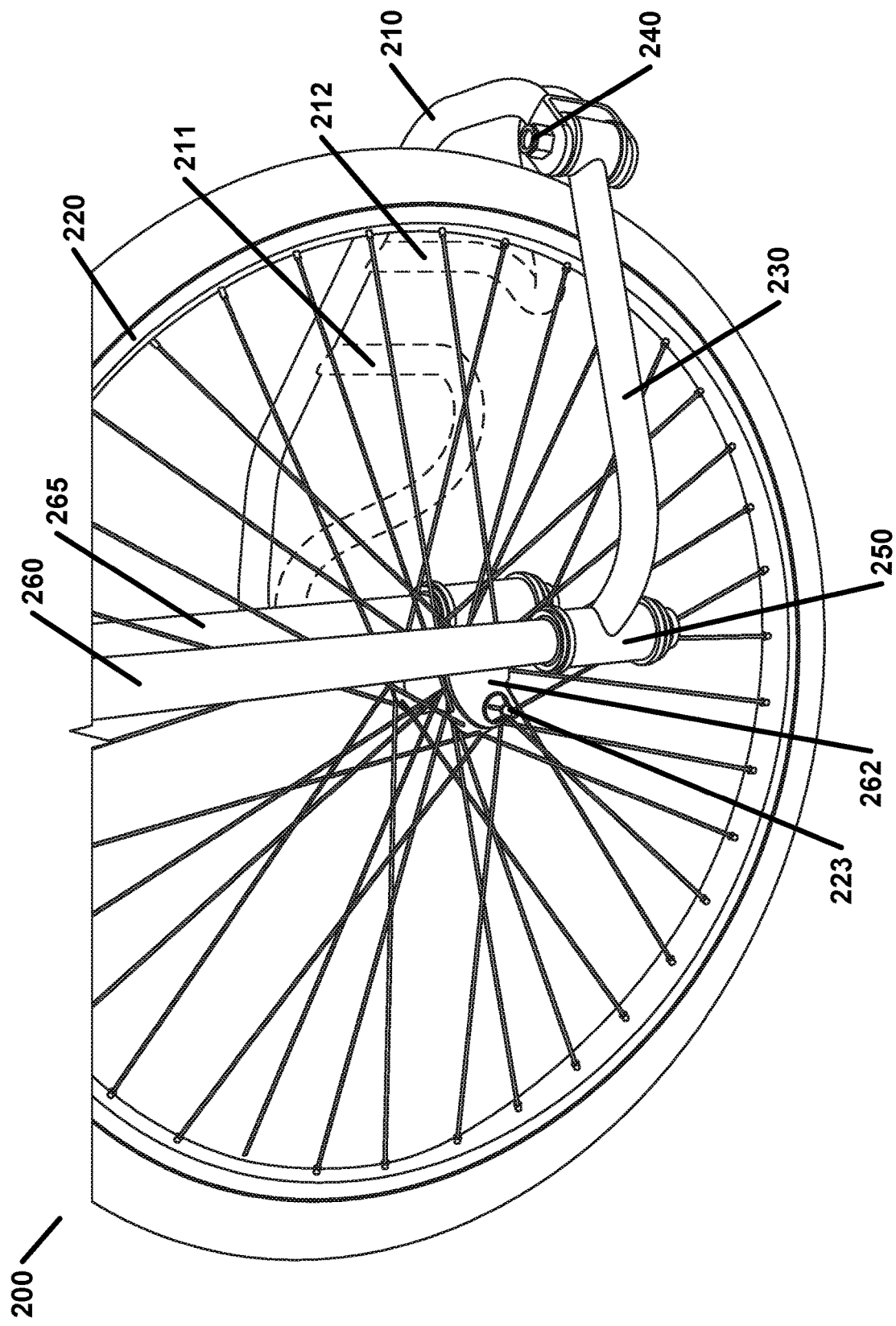
FIG. 2 is an illustration of an example under-axle steering assembly as per various aspects of various embodiments.

FIG. 2 illustrates an example under-axle steering assembly 200 equipped with a wheel (for example 220) turned mostly to one side as per an aspect of various embodiments. Head tube assembly 250 may be disposed to the lower side of a first steer tube 260. Arm 230 may connect head tube assembly 250 and pivot connection 240. Support structure 210 may comprise at least a part of pivot connection 240. Support structure 210 may comprise additional support (for example 211, 212). The lower side of the first steer tube 260 may be connected to a first axle mounting structure 262 configured to accept a first end 223 of an axle assembly of wheel 220. The lower side of a second steer tube 265 may be connected to a second axle mounting structure (not shown) configured to accept a second end (not shown) of the axle assembly of wheel 220.

Figure 3:
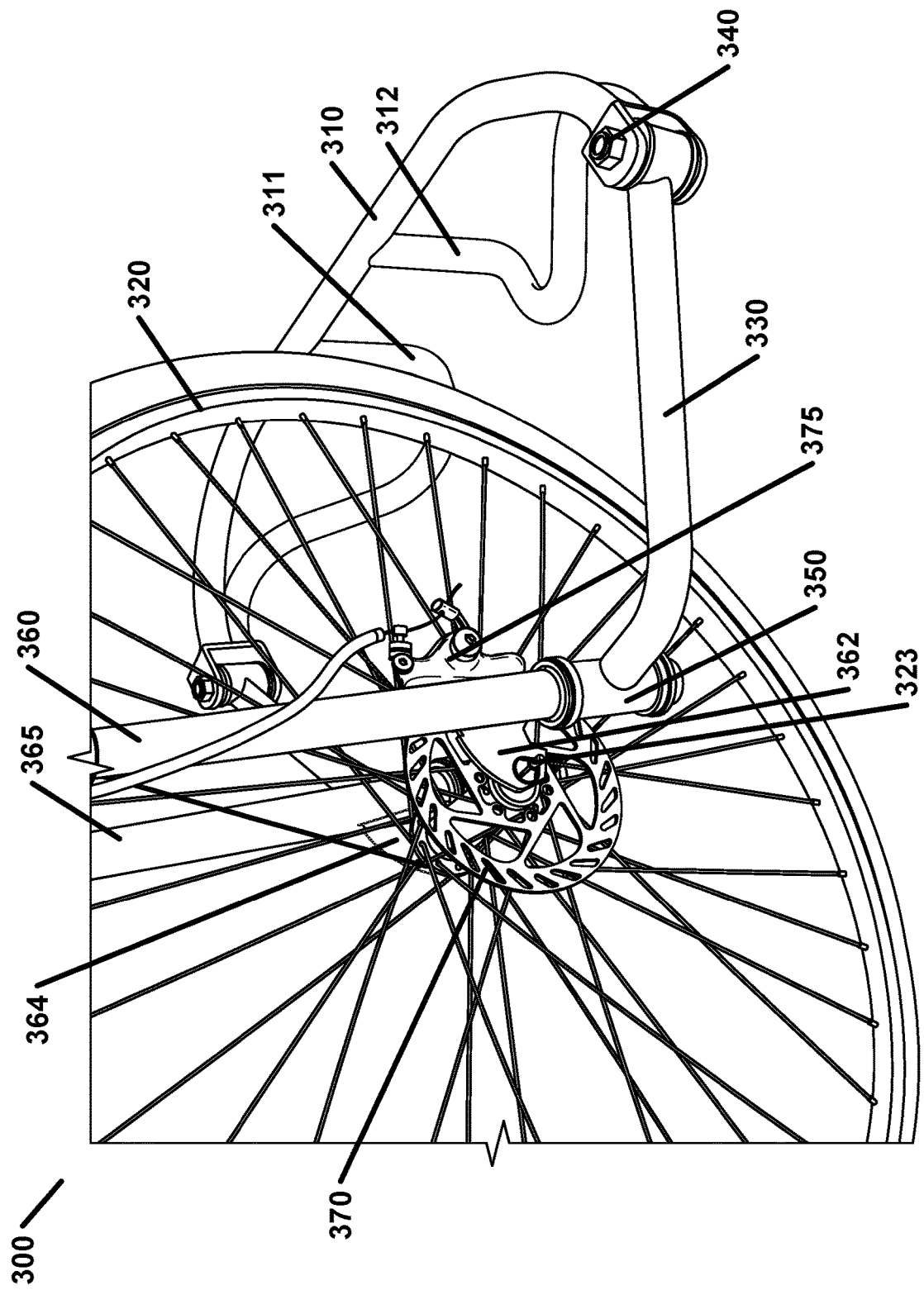
FIG. 3 is an illustration of an example under-axle steering assembly as per an aspect of various embodiments.

FIG. 3 illustrates an example under-axle steering assembly 300 equipped with a wheel (for example 320) and a disc brake (for example 375) as per aspects of various embodiments. Head tube assembly 350 may be disposed to the lower side of a first steer tube 360. Arm 330 may connect head tube assembly 350 and pivot connection 340. Support structure 310 may comprise at least a part of pivot connection 340. Support structure 310 may comprise additional support (for example 311, 312). The lower side of the first steer tube 360 may be connected to a first axle mounting structure 362 configured to accept a first end 323 of an axle assembly of wheel 320. The lower side of the first steer tube 360 may be connected to disc brake 375. Disc brake 375 may be configured to receive rotor 370. Rotor 370 may be connected to the wheel 320. The lower side of a second steer tube 365 may be connected to a second axle mounting structure 364 configured to accept a second end (not shown) of the axle assembly of wheel 320.

Figure 4:
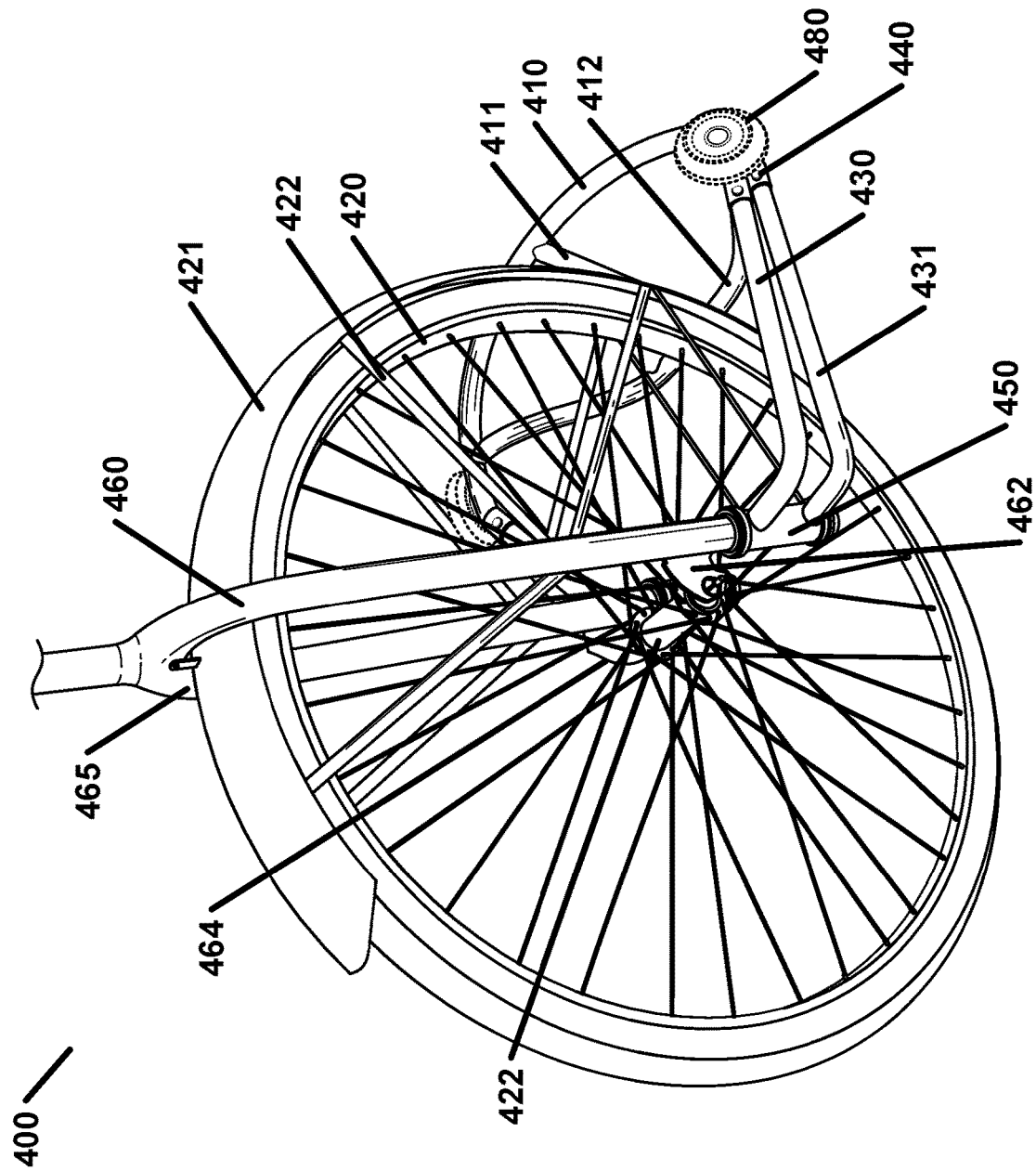
FIG. 4 is an illustration of an example under-axle steering assembly as per various aspects of various embodiments.

FIG. 4 illustrates an example under-axle steering assembly 400 equipped with a wheel (for example 420) pointed mostly straight ahead as per various aspects of various embodiments. Head tube assembly 450 may be disposed to the lower side of a first steer tube 460. An upper first arm 430 may connect an upper portion of head tube assembly 450 and pivot connection 440. A lower first arm 431 may connect a lower portion of head tube assembly 450 and pivot connection 440. Support structure 410 may comprise at least a part of pivot connection 440. Support structure 410 may comprise additional support (for example 411, 412). Support structure 410 may comprise at least one anti-skid wheel (for example 480). The lower side of the first steer tube 460 may be connected to a first axle mounting structure 462 configured to accept a first end of an axle assembly 422 of wheel 420. The lower side of a second steer tube 465 may be connected to a second axle mounting structure 464 configured to accept a second end of the axle assembly 422 of wheel 420. First steer tube 460 and second steer tube 465 may be disposed to fender 421. Fender struts (for example 422) may be employed to connect fender 421 to at least one steer tube (for example 460).

Figure 5:
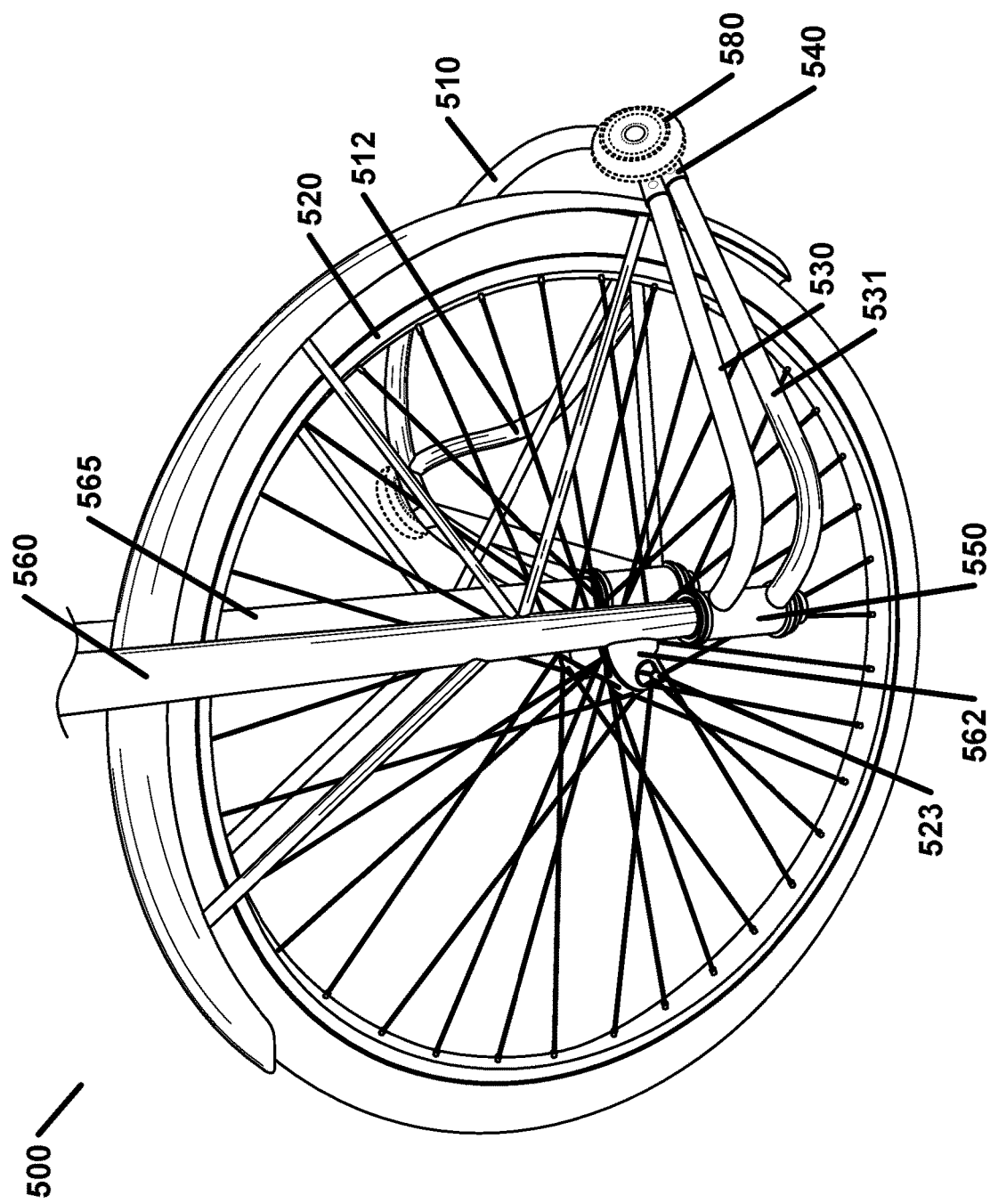
FIG. 5 is an illustration of an example under-axle steering assembly as per various aspects of various embodiments.

FIG. 5 illustrates an example under-axle steering assembly 500 equipped with a wheel (for example 520) turned mostly to one side as per various aspects of various embodiments. Head tube assembly 550 may be disposed to the lower side of a first steer tube 560. An upper first arm 530 may connect an upper portion of head tube assembly 550 and pivot connection 540. A lower first arm 531 may connect a lower portion of head tube assembly 550 and pivot connection 540. Support structure 510 may comprise at least a part of pivot connection 540. Support structure 510 may comprise additional support (for example 512). Support structure 510 may be connected to at least one anti-skid wheel (for example 580). The lower side of the first steer tube 560 may be connected to a first axle mounting structure 562 configured to accept a first end 523 of an axle assembly of wheel 520. The lower side of a second steer tube 565 may be connected to a second axle mounting structure (not shown) configured to accept a second end (not shown) of an axle assembly of wheel 520.

Figure 6:
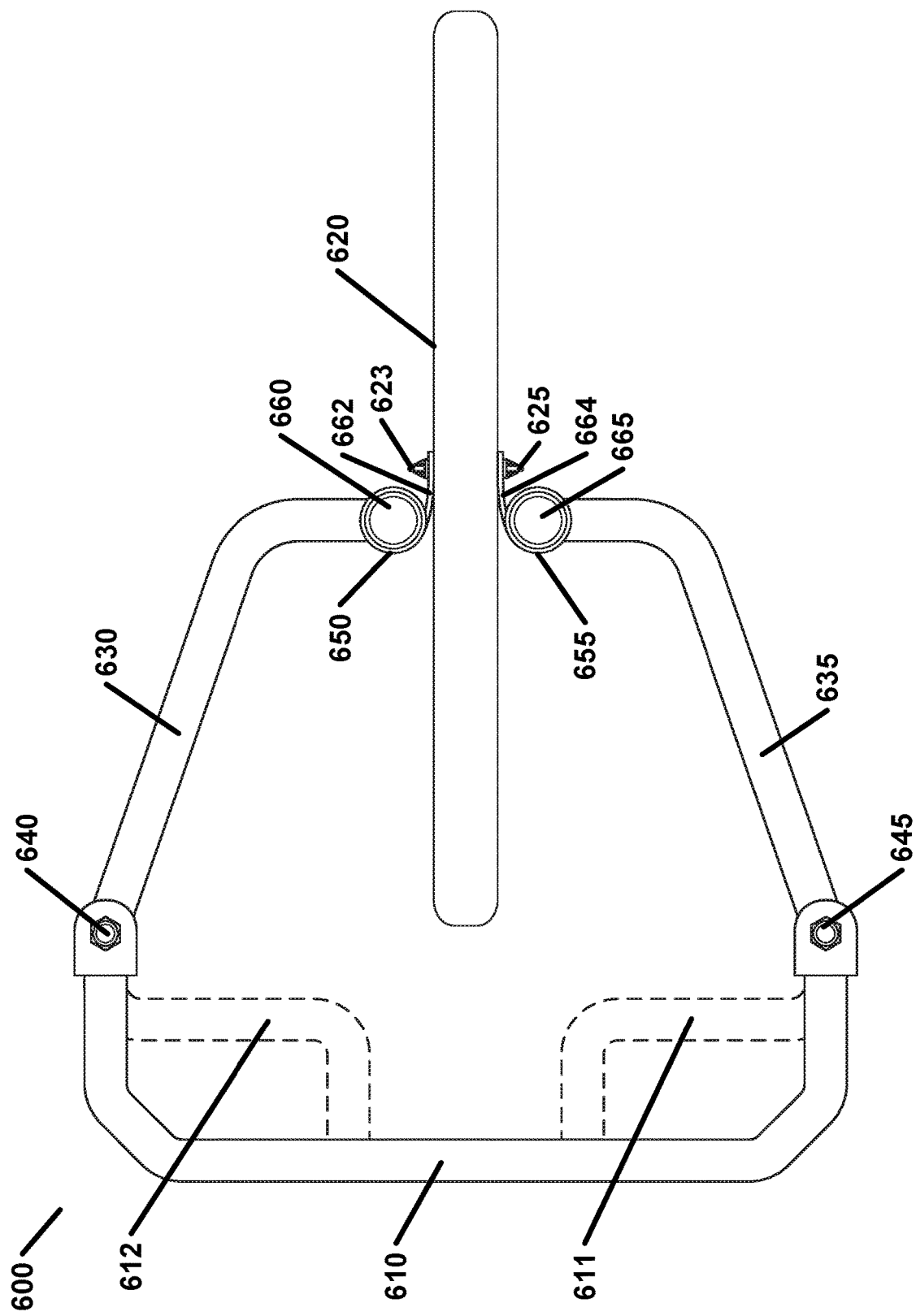
FIG. 6 is an illustration of an example under-axle steering assembly as per various aspects of various embodiments.

FIG. 6 illustrates a top down view of an example under-axle steering assembly 600 equipped with wheel 620 pointed mostly straight ahead as per various aspects of various embodiments. Head tube assembly 650 may be disposed to the lower side of steer tube 660. Head tube assembly 655 may be disposed to the lower side of steer tube 665. Arm 630 may connect head tube assembly 650 and pivot connection 640. Arm 635 may connect head tube assembly 655 and pivot connection 645. Support structure 610 may comprise at least a part of pivot connection 640 and at least a part of pivot connection 645. Support structure 610 may comprise additional support (for example 611, 612). The lower side of a first steer tube 660 may be connected to a first axle mounting structure 662 configured to accept a first end 623 of an axle assembly of wheel 620. The lower side of a second steer tube 665 may be connected to a second axle mounting structure 664 configured to accept a second end 625 of an axle assembly of wheel 620.

According to some of the various embodiments, an apparatus may comprise a third steer tube. A third steer tube may be connected to a first upper side of a first steer tub and a second upper side of a second steer tube above a wheel. The third steer tube may be configured to connect to a handlebar, a wheel, a tiller, at least one handle, at least one pedal, at least one lever, at least one cable, at least one chain, at least one pulley, combinations thereof, and/or the like.

Figure 7:
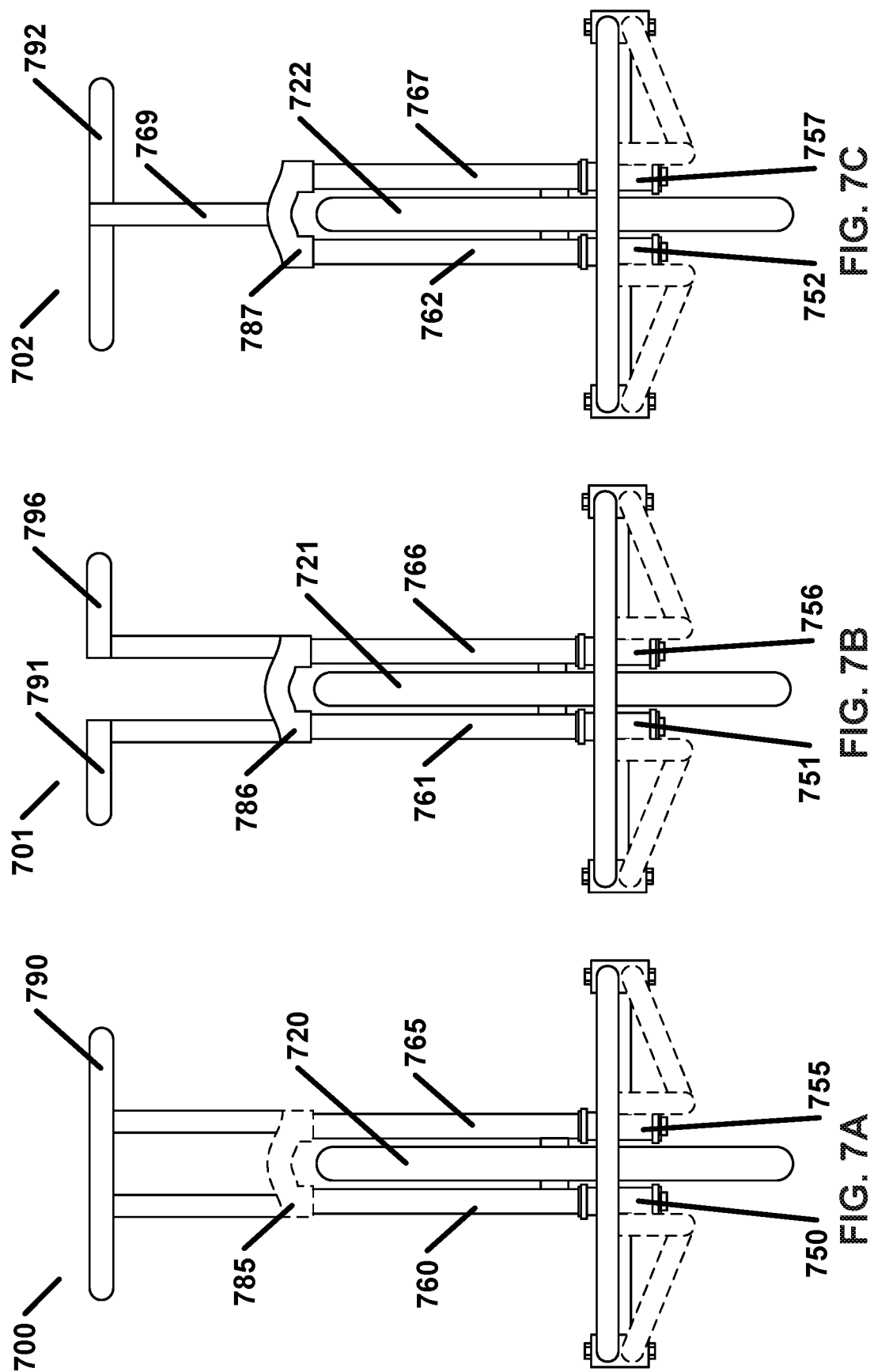
FIGS. 7A, 7B, and 7C are illustrations of example steer tube configurations for an example under-axle steering assembly as per various aspects of various embodiments.

FIG. 7A illustrates a rear view of an example under-axle steering assembly 700 as per various aspects of various embodiments. Head tube assembly 750 may be disposed to the lower side of steer tube 760. Head tube assembly 755 may be disposed to the lower side of steer tube 765. Some of the various embodiments of an under-axle steering assembly 700 may comprise a crown 785. Crown 785 may connect the upper side of steer tube 760 and the upper side of steer tube 765. Crown 785 may be located above wheel 720. The upper side of steer tube 760 and the upper side of steer tube 765 may each connect to handlebar 790. Crown 785 may be connected to a wheel fender (not shown).

FIG. 7B illustrates a rear view of an example under-axle steering assembly 701 as per various aspects of various embodiments. Head tube assembly 751 may be disposed to the lower side of steer tube 761. Head tube assembly 756 may be disposed to the lower side of steer tube 766. Some of the various embodiments of an under-axle steering assembly 701 may comprise a crown 786. Crown 786 may connect the upper side of steer tube 761 and the upper side of steer tube 766. Crown 786 may be located above wheel 721. The upper side of steer tube 761 may connect to handle 791. The upper side of steer tube 766 may connect to handle 796. Crown 786 may be connected to a wheel fender (not shown).

FIG. 7C illustrates a rear view of an example under-axle steering assembly 702 as per various aspects of various embodiments. Head tube assembly 752 may be disposed to the lower side of steer tube 762. Head tube assembly 757 may be disposed to the lower side of steer tube 767. Crown 787 may connect the upper side of steer tube 762 and the upper side of steer tube 767 to steer tube 769. Crown 787 may be located above wheel 722. Steer tube 769 may connect to handlebar 792. Crown 787 may be connected to a wheel fender (not shown). Steer tube 769 may be connected to a wheel fender (not shown).

According to some of the various embodiments, a steer tube may comprise a height adjuster. The height adjuster may be configured to adjust the overall length of the steer tube. The height adjuster may be configured to adjust the height of at least one mechanism configured to at least steer a wheel. The height adjuster may be configured to adjust the reach of a rider employing the at least one mechanism. A steer tube may comprise a first tube and a second tube. The first tube may be configured to fit inside the second tube. A height adjuster may comprise a hitch pin, a pinch bolt, an adjustable tube collar, a quick release clamp, combinations thereof, and/or the like. A steer tube may be disposed to a wheel fender. A steer tube may be connected to a wheel fender.

Figure 8:
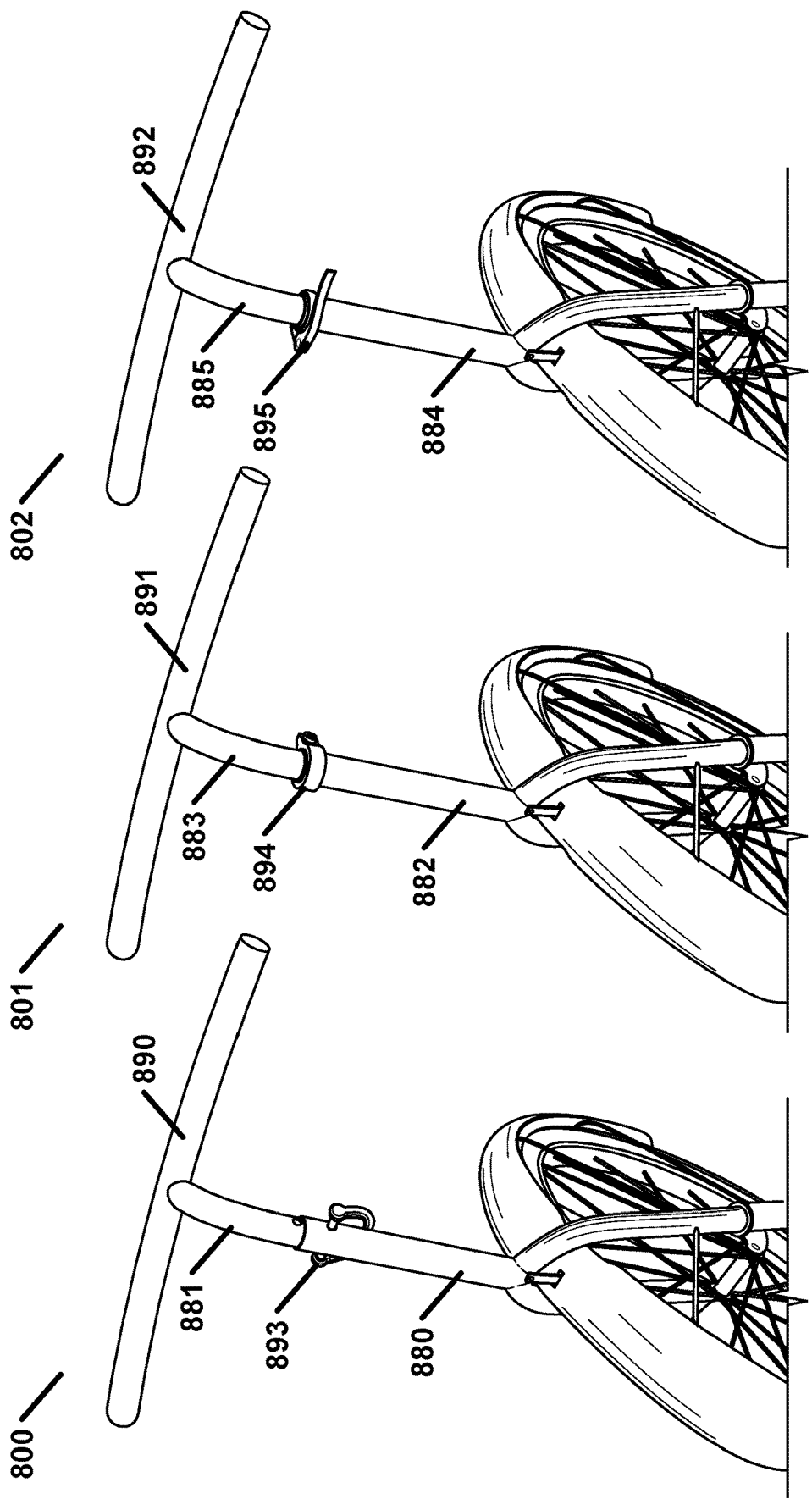
FIGS. 8A, 8B, and 8C are illustrations of example steer tube height adjuster configurations for an example under-axle steering assembly as per various aspects of various embodiments.

FIG. 8A illustrates a view of an example steer tube height adjuster 893 for an example under-axle steering assembly 800 as per an aspect of various embodiments. A steer tube may comprise a first tube 881 and a second tube 880. The first tube 881 may be configured to fit inside the second tube 880. The height adjuster 893 may comprise a hitch pin. The height adjuster 893 may be configured to adjust the overall length of a steer tube (for example the combination of 880 and 881). The height adjuster 893 may be configured to adjust the overall height of at least one mechanism configured to at least steer a wheel (for example handlebar 890).

FIG. 8B illustrates a view of an example steer tube height adjuster 894 for an example under-axle steering assembly 801 as per an aspect of various embodiments. A steer tube may comprise a first tube 883 and a second tube 882. The first tube 883 may be configured to fit inside the second tube 882. The height adjuster 894 may comprise a tube collar and at least one pinch bolt. The height adjuster 894 may be configured to adjust the overall length of a steer tube (for example the combination of 882 and 883). The height adjuster 894 may be configured to adjust the overall height of at least one mechanism configured to at least steer a wheel (for example handlebar 891).

FIG. 8C illustrates a view of an example steer tube height adjuster 895 for an example under-axle steering assembly 802 as per an aspect of various embodiments. A steer tube may comprise a first tube 885 and a second tube 884. The first tube 885 may be configured to fit inside the second tube 884. The height adjuster 895 may comprise a tube collar and a quick release clamp. The height adjuster 895 may be configured to adjust the overall length of a steer tube (for example the combination of 885 and 884). The height adjuster 895 may be configured to adjust the overall height of at least one mechanism configured to at least steer a wheel (for example handlebar 892).

According to some of the various embodiments, a support structure may be at least a part of a platform and/or frame. The support structure may be configured to connect to a platform and/or frame. The platform and/or frame may be at least partially forged, partially milled, partially fabricated, combinations thereof, and/or the like. The platform and/or frame may be configured to accept a second wheel. The platform and/or frame may be configured to keep a second wheel straight. The second wheel may, for example, be configured as the rear wheel of a bicycle or scooter. Alternatively, a second wheel may, for example, be configured as the front wheel of a bicycle and/or scooter with a steerable rear wheel. A bicycle and/or scooter with a steerable rear wheel may employ an under-axle steering assembly configured to accept the rear wheel. Each wheel, on a bicycle or scooter employing an under-axle steering assembly, may comprise distinct diameters, widths, materials, tire types, braking surfaces, combinations thereof, and/or the like. The axle height for a front wheel may be distinct from the axle height of a rear wheel.

Figure 9:
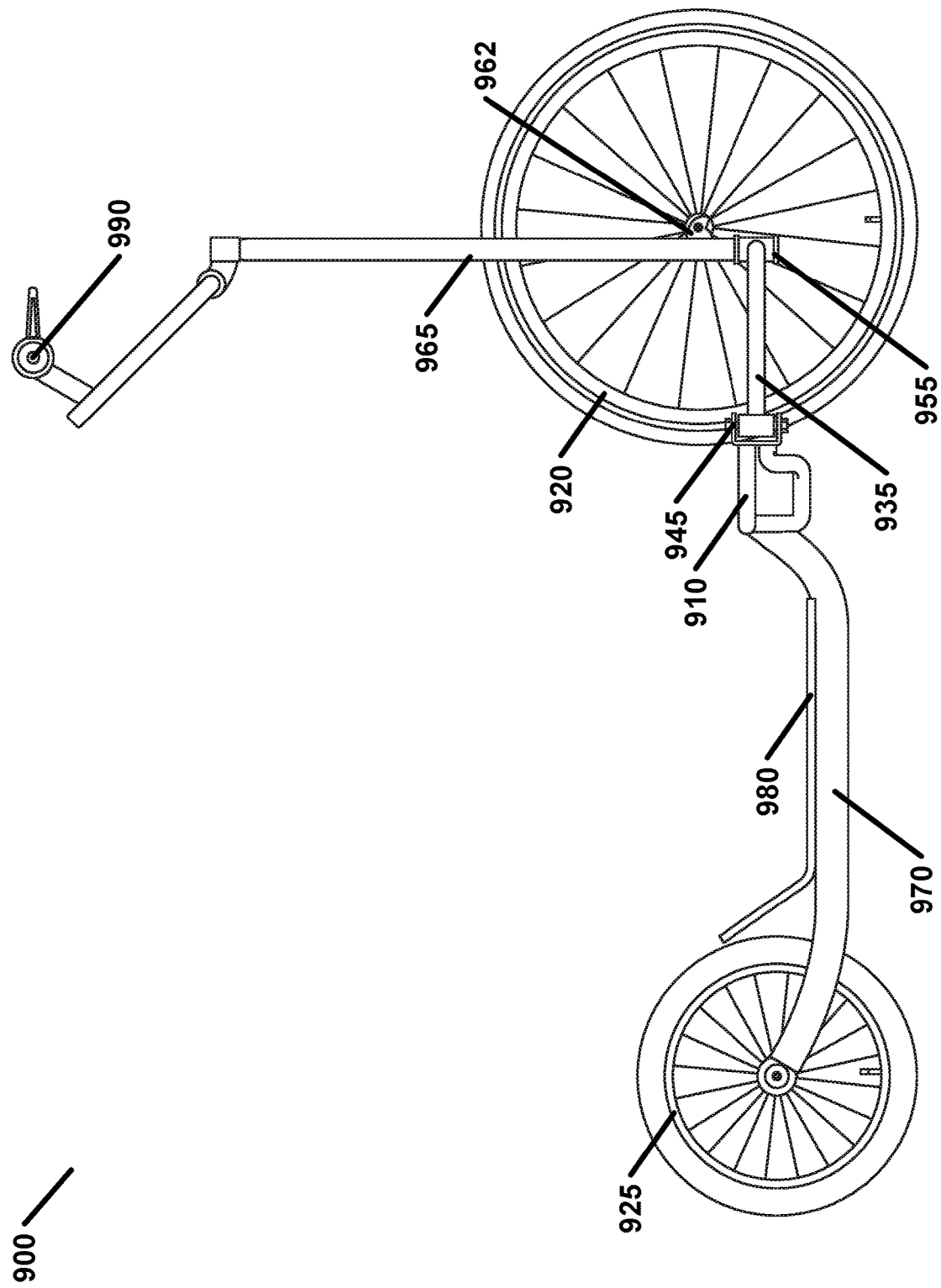
FIG. 9 is an illustration of an example scooter employing an under-axle steering assembly as per an aspect of various embodiments.

FIG. 9 illustrates one side of an example scooter 900 employing an under-axle steering assembly as per aspects of various embodiments. Head tube assembly 955 may be disposed to the lower side of steer tube 965. The upper side of steer tube 965 may connect to handlebar 990. Arm 935 may connect head tube assembly 955 and pivot connection 945. Support structure 910 may comprise at least a part of pivot connection 945. The lower side of steer tube 965 may be connected to a first axle mounting structure 962 configured to accept a first end of an axle assembly of first wheel 920. Support structure 910 may be connected to frame 970. Frame 970 may be configured to accept an axle assembly of second wheel 925. Frame 970 may support a platform 980.

Figure 10:
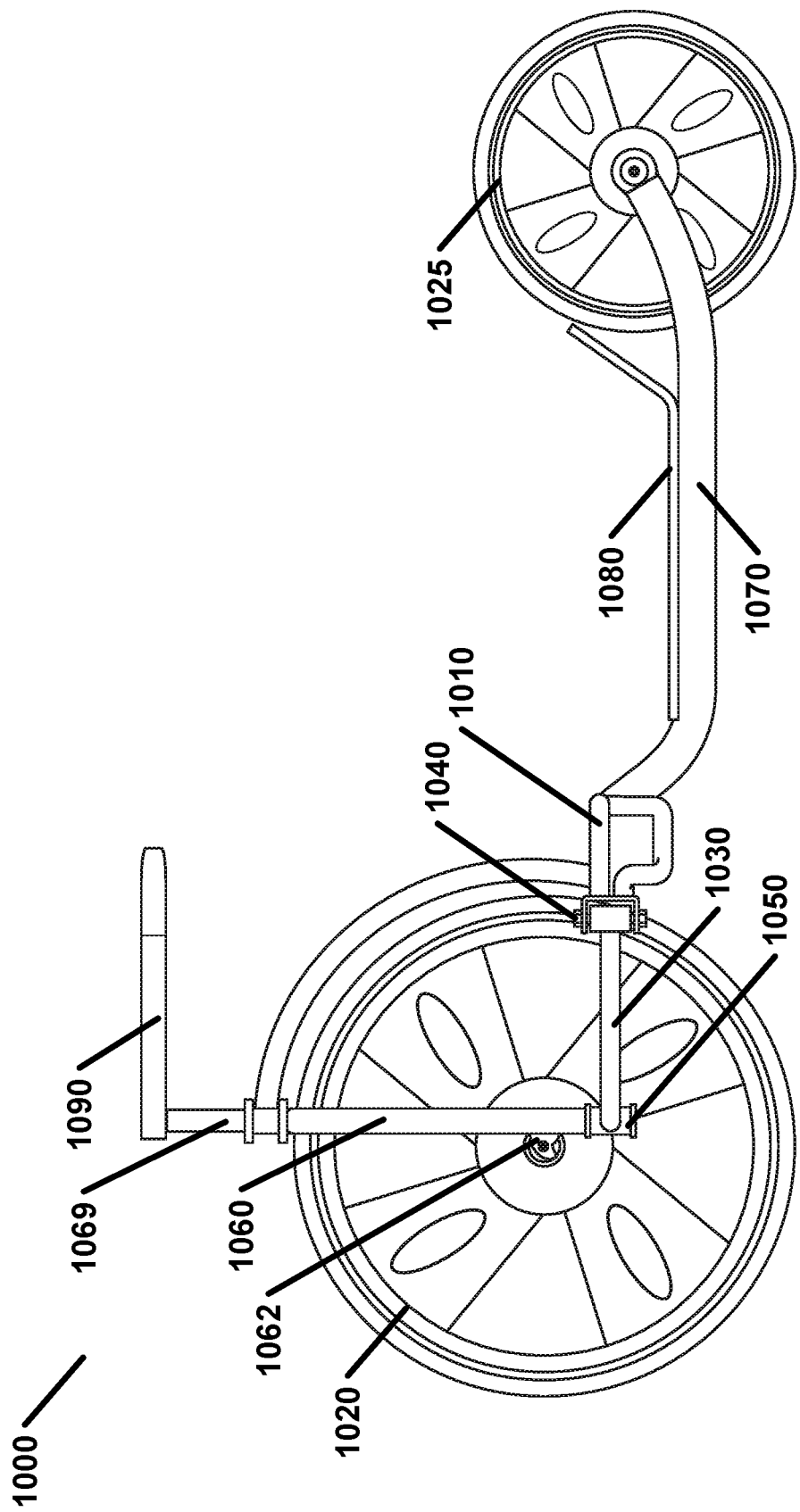
FIG. 10 is an illustration of an example scooter employing an under-axle steering assembly as per an aspect of various embodiments.

FIG. 10 illustrates one side of an example scooter 1000 employing an under-axle steering assembly as per aspects of various embodiments. Head tube assembly 1050 may be disposed to the lower side of steer tube 1060. The upper side of steer tube 1060 may connect to steer tube 1069. Steer tube 1069 may connect to tiller 1090. Arm 1030 may connect head tube assembly 1050 and pivot connection 1040. Support structure 1010 may comprise at least a part of pivot connection 1040. The lower side of steer tube 1060 may be connected to a first axle mounting structure 1062 configured to accept a first end of an axle assembly of first wheel 1020. First wheel 1020 may be configured as a rear wheel. Support structure 1010 may be connected to frame 1070. Frame 1070 may be configured to accept an axle assembly of second wheel 1025. Second wheel 1025 may be configured as a front wheel. Frame 1070 may support a platform 1080.

Figure 11:
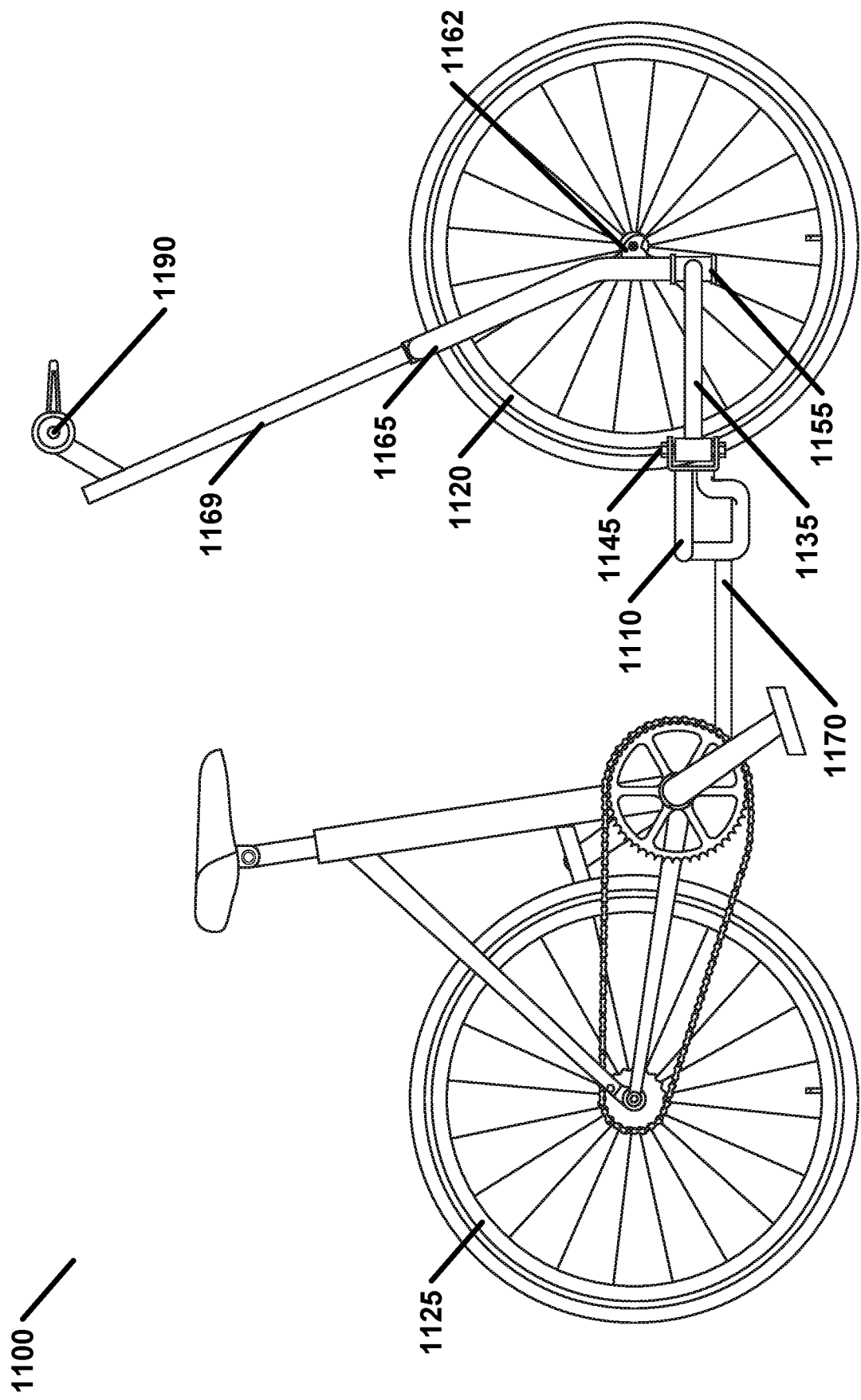
FIG. 11 is an illustration of an example bicycle employing an under-axle steering assembly as per an aspect of various embodiments.

FIG. 11 illustrates one side of an example bicycle 1100 employing an under-axle steering assembly as per aspects of various embodiments. Head tube assembly 1155 may be disposed to the lower side of steer tube 1165. Steer tube 1169 may connect to an upper side of steer tube 1165 and handlebar 1190. Arm 1135 may connect head tube assembly 1155 to pivot connection 1145. Support structure 1110 may comprise at least a part of pivot connection 1145. The lower side of steer tube 1165 may be connected to a first axle mounting structure 1162 configured to accept a first end of an axle assembly of first wheel 1120. Support structure 1110 may be connected to frame 1170. Frame 1170 may be configured to accept an axle assembly of second wheel 1125.

Figure 12:
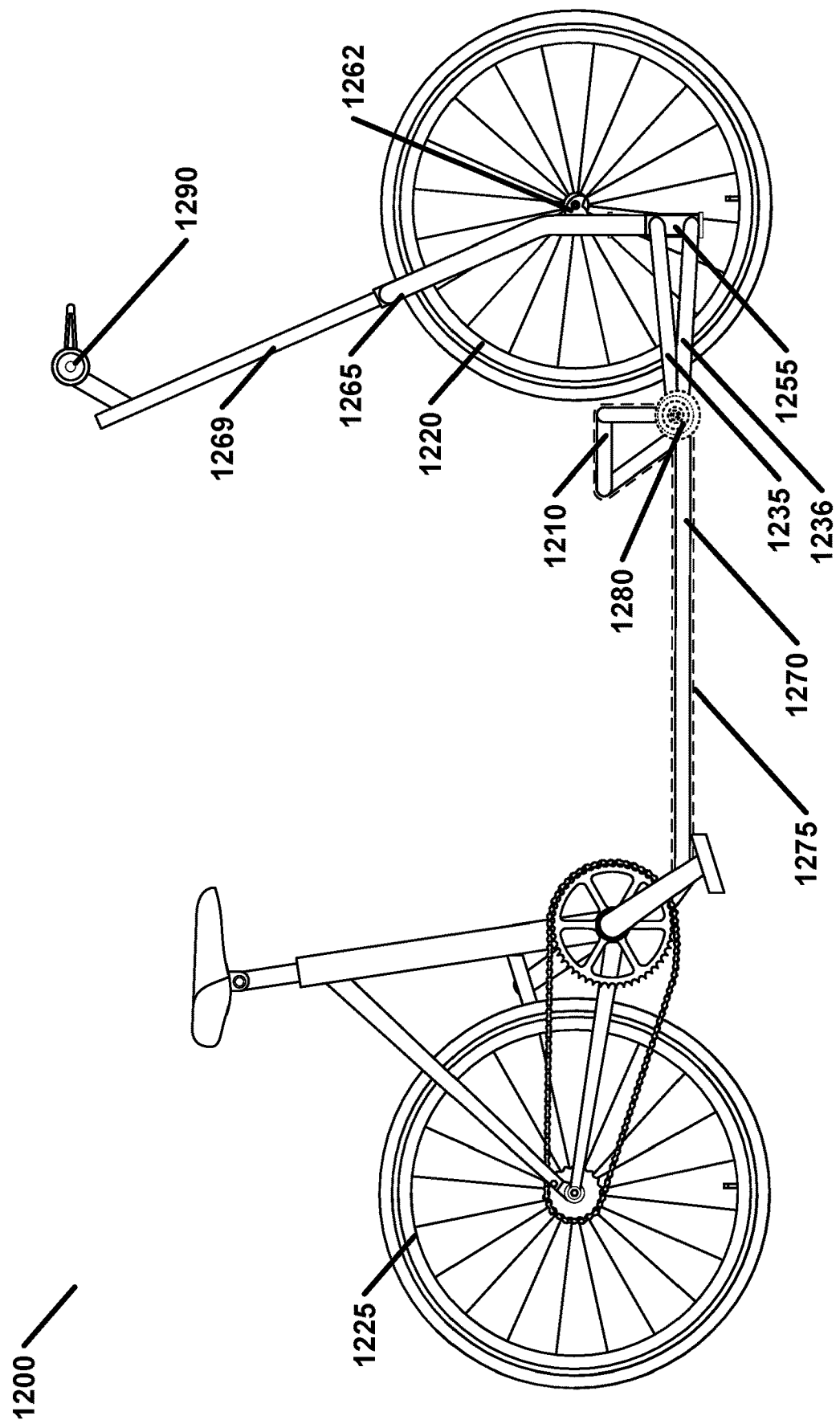
FIG. 12 is an illustration of an example combination bicycle and scooter employing an under-axle steering assembly as per various aspects of various embodiments.

FIG. 12 illustrates one side of an example combination of a bicycle and scooter 1200 employing an under-axle steering assembly as per various aspects of various embodiments. Head tube assembly 1255 may be disposed to the lower side of steer tube 1265. Steer tube 1269 may connect to an upper side of steer tube 1265 and handlebar 1290. Upper arm 1235 may connect an upper portion of head tube assembly 1255 to a pivot connection (not shown). Lower arm 1236 may connect a lower portion of head tube assembly 1255 to a pivot connection (not shown). Support structure 1210 may comprise at least a part of at least one pivot connection (not shown). The lower side of steer tube 1265 may be connected to a first axle mounting structure 1262 configured to accept a first end of an axle assembly of first wheel 1220. Support structure 1210 may be connected to frame 1270. Frame 1270 may be at least partially covered with a shell (for example 1275). A shell (for example 1275) may comprise fiberglass, carbon fiber, at least one metal, wood, combinations thereof, and/or the like. Frame 1270 may be configured to accept an axle assembly of second wheel 1225. Support structure 1210 may be disposed to at least one anti-skid wheel 1280.

Figure 13:
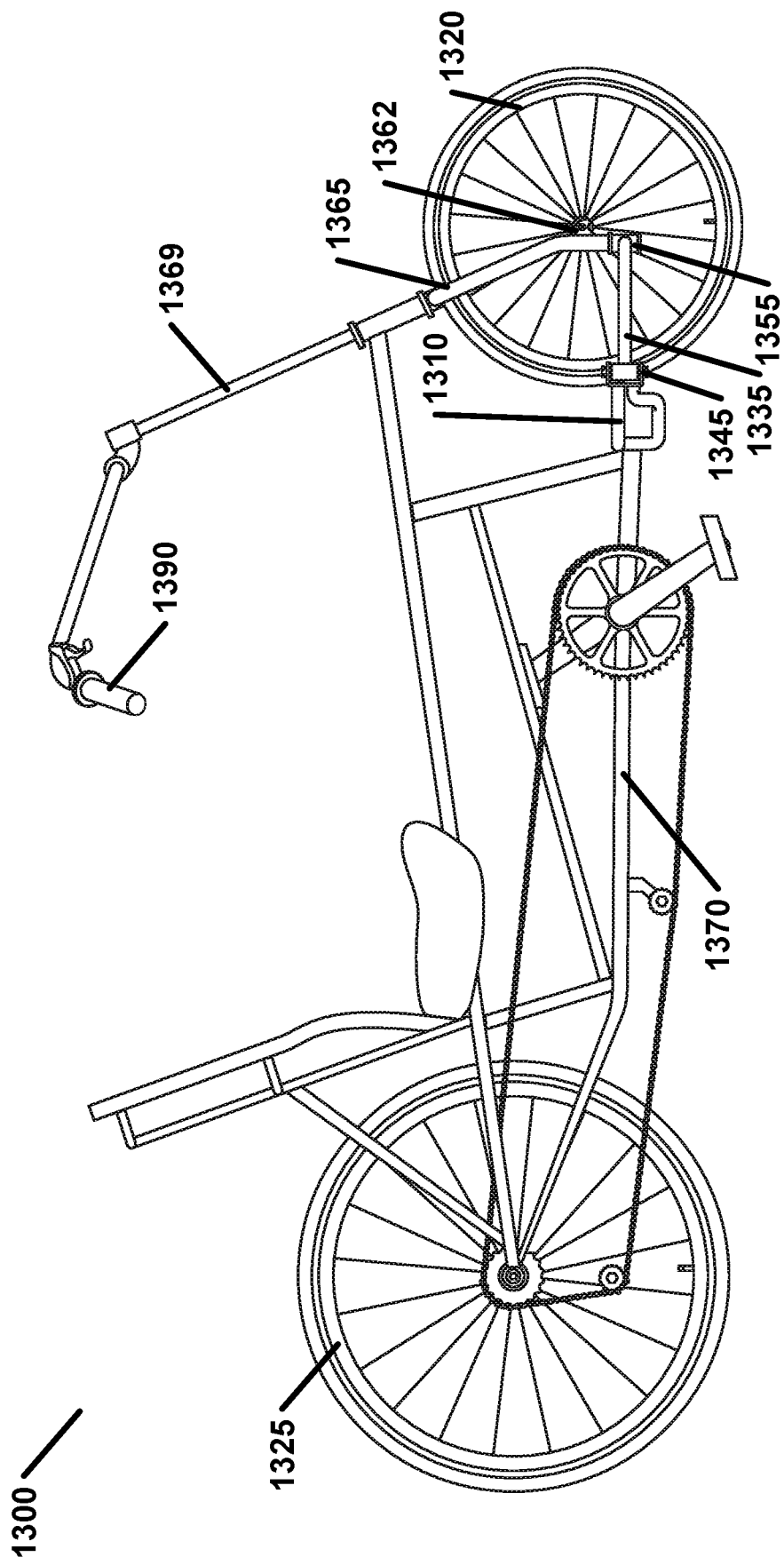
FIG. 13 is an illustration of an example recumbent bicycle employing an under-axle steering assembly as per an aspect of various embodiments.

FIG. 13 illustrates one side of an example recumbent bicycle 1300 employing an under-axle steering assembly as per aspects of various embodiments. Head tube assembly 1355 may be disposed to the lower side of steer tube 1365. Steer tube 1369 may connect to an upper side of steer tube 1365 and handlebar 1390. Arm 1335 may connect head tube assembly 1355 and pivot connection 1345. Support structure 1310 may comprise at least a part of pivot connection 1345. The lower side of steer tube 1365 may be connected to a first axle mounting structure 1362 configured to accept a first end of an axle assembly of first wheel 1320. Support structure 1310 may be connected to frame 1370. Frame 1370 may be configured to accept an axle assembly of second wheel 1325.

Figure 14:
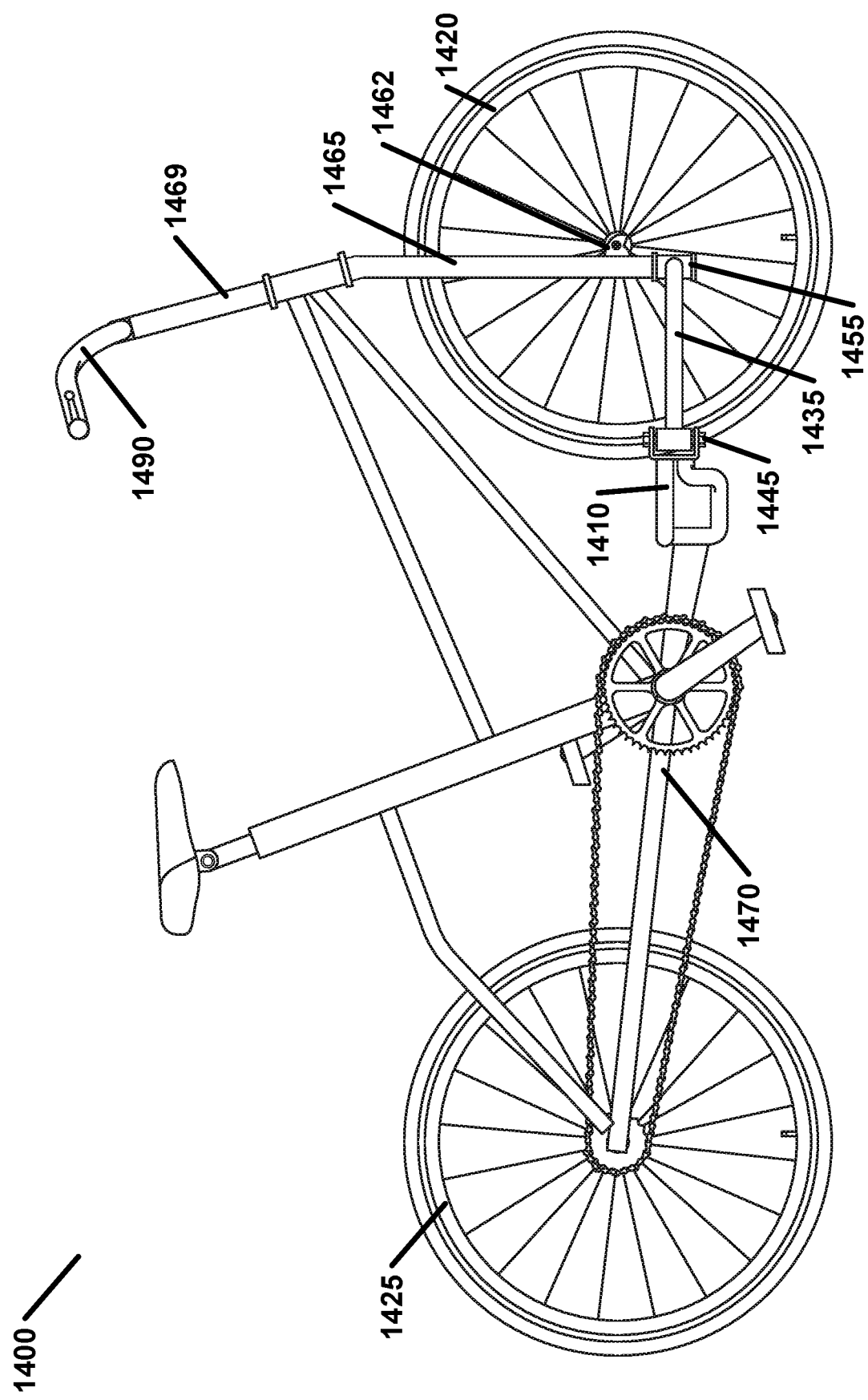
FIG. 14 is an illustration of an example bicycle employing an under-axle steering assembly as per an aspect of various embodiments.

FIG. 14 illustrates one side of an example bicycle 1400 employing an under-axle steering assembly as per aspects of various embodiments. Head tube assembly 1455 may be disposed to the lower side of steer tube 1465. Steer tube 1469 may connect to an upper side of steer tube 1465 and handlebar 1490. Arm 1435 may connect head tube assembly 1455 and pivot connection 1445. Support structure 1410 may comprise at least a part of pivot connection 1445. The lower side of steer tube 1465 may be connected to a first axle mounting structure 1462 configured to accept a first end of an axle assembly of first wheel 1420. Support structure 1410 may be connected to frame 1470. Frame 1470 may be configured to accept an axle assembly of second wheel 1425.

Persons skilled in the art will recognize that many types of wheeled vehicles may be configured with an under-axle steering assembly. The previous examples are presented as illustrations of the possible wheeled vehicles which may be configured with an under-axle steering assembly. The types of wheeled vehicles that may include an under-axle steering assembly may comprise, but are not limited to: a scooter, a bicycle, a tandem, a sociable, a glide bike, a treadle bicycle, a treadle tricycle, an elliptical bicycle, an elliptical tricycle, a sideways bike, a prone bicycle, a tricycle, a trike, combinations thereof, and/or the like.

Persons skilled in the art will also recognize that wheeled vehicles may be configured for a variety of propulsion types. Propulsion types may comprise human power, at least one propulsion assist system, at least one dedicated propulsion system, combinations thereof, and/or the like. A propulsion assist system may comprise at least one electric motor, at least one engine, at least one propeller, at least one turbine, at least one energy source, at least one kite, at least one sail, a combination thereof, and/or the like. A dedicated propulsion system may comprise at least one electric motor, at least one engine, at least one propeller, at least one turbine, at least one energy source, a combination thereof, and/or the like. An electric motor may be configured to engage with a drivetrain, a wheel hub, a wheel axle, a tire, combinations thereof, and/or the like. An electric motor may be at least partially contained in a hub of a wheel. An engine may be configured to engage with a drivetrain, a wheel hub, a wheel axle, a tire, combinations thereof, and/or the like. An engine may be at least partially contained in a hub of a wheel. An energy source may comprise at least one battery, at least one fuel, at least one fuel cell, at least one solar cell, combinations thereof, and/or the like.

According to some of the various embodiments, an apparatus may comprise at least one suspension component. The at least one suspension component may be disposed, for example, between a support structure and a wheel. The at least one suspension component may be disposed, for example, between a first steer tube and a first head tube assembly. The at least one suspension component may be disposed, for example, between a second steer tube and a second head tube assembly. The at least one suspension component may be disposed on the first steer tube, disposed on the second steer tube, combinations thereof, and/or the like. At least one of the at least one suspension component may comprise a suspension damping device.

According to some of the various embodiments, a method may comprise connecting a first lower side of a first steer tube to a first axle mounting structure. The first axle mounting structure may be configured to connect to a first end of an axle assembly of a wheel. The method may comprise connecting a second lower side of a second steer tube to a second axle mounting structure. The second axle mounting structure may be configured to connect to a second end of the axle assembly. The method may comprise connecting a first head tube assembly to the first lower side. The method may comprise connecting a second head tube assembly to the second lower side. The method may comprise connecting a first portion of a first arm to the first head tube assembly. The method may comprise connecting a second portion of the first arm to a first pivot connection of a support structure. The method may comprise connecting a first portion of a second arm to the second head tube assembly. The method may comprise connecting a second portion of the second arm to a second pivot connection of the support structure. The method may comprise connecting a third steer tube above the wheel to an upper side of the first steer tube and an upper side of the second steer tube.

According to some of the various embodiments, a method may comprise connecting a third steer tube to a handlebar, a wheel, a tiller, at least one handle, at least one pedal, at least one lever, at least one cable, at least one chain, at least one pulley, combinations thereof, and/or the like. The method may comprise coupling an upper side of a first steer tube and an upper side of a second steer tube to a handlebar, a wheel, a tiller, at least one handle, at least one pedal, at least one lever, at least one cable, at least one chain, at least one pulley, combinations thereof, and/or the like.

According to some of the various embodiments, a method may comprise securing a first lower side of a first steer tube in a first head tube assembly through employment of a bearing race, a star nut, a bolt, a threaded rod, a nut, an expansion bolt, a threaded cap, a compression cap, a compression nut, combinations thereof, and/or the like. The method may comprise securing a second lower side of a second steer tube in a second head tube assembly through employment of a bearing race, a star nut, a bolt, a threaded rod, a nut, an expansion bolt, a threaded cap, a compression cap, a compression nut, combinations thereof, and/or the like.

According to some of the various embodiments, a method may comprise connecting at least one anti-skid wheel to a support structure. The method may comprise attaching at least one suspension component to the support structure, a first steer tube, a first head tube assembly, a second steer tube, a second head tube assembly, a third steer tube, combinations thereof, and/or the like. The method may comprise attaching a frame to the support structure. The method may comprise attaching a platform to the support structure.

Figure 15:
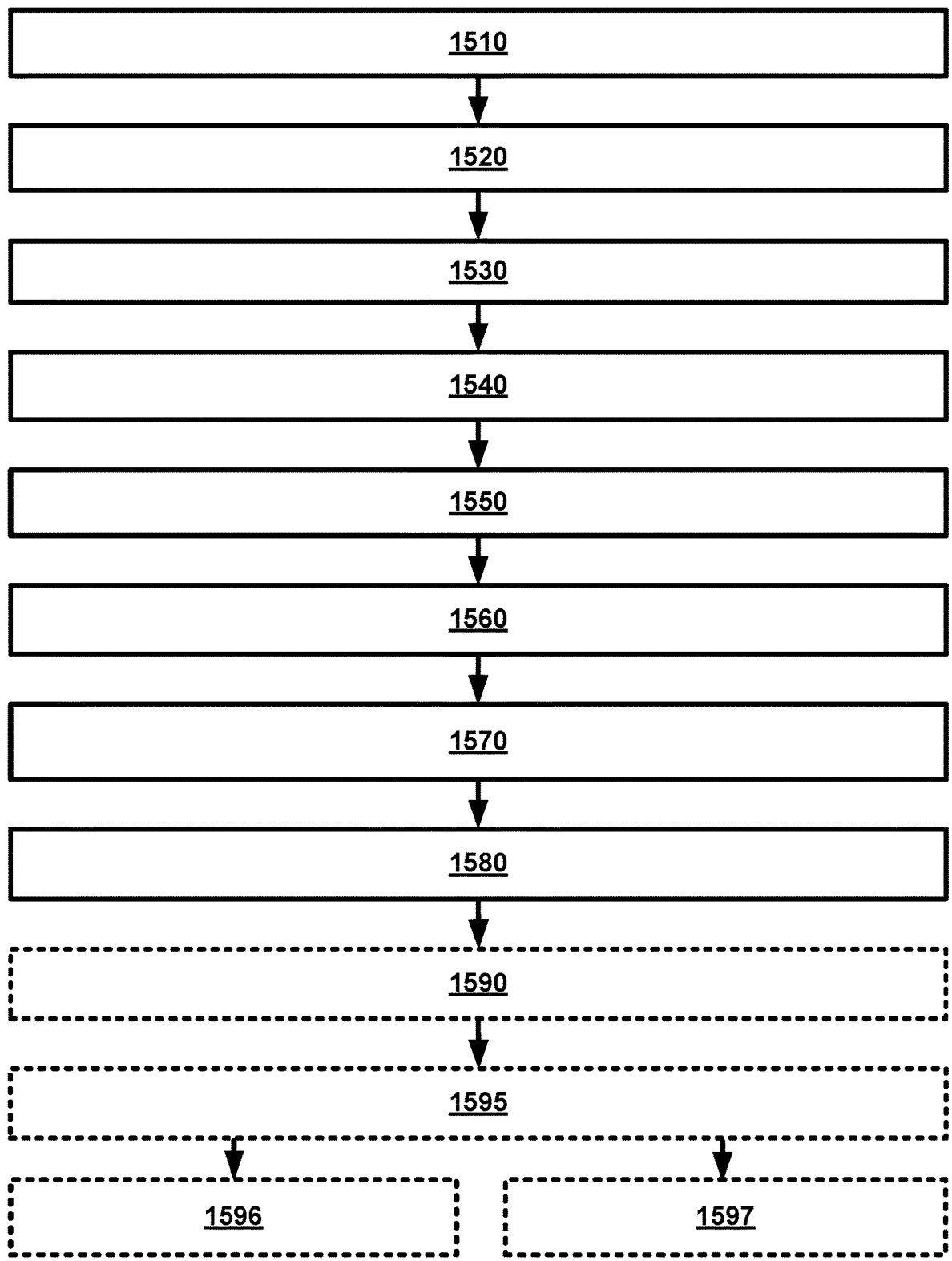
FIG. 15 is an example flow diagram of a method of manufacturing an under-axle steering assembly as per various aspects of various embodiments.

FIG. 15 is an example flow diagram of a method of manufacturing an under-axle steering assembly as per various aspects of various embodiments. A first lower side of a first steer tube may be connected to a first axle mounting structure at 1510. The first axle mounting structure may be configured to connect to a first end of an axle assembly of a wheel. A second lower side of a second steer tube may be connected to a second axle mounting structure at 1520. The second axle mounting structure may be configured to connect to a second end of the axle assembly. A first head tube assembly may be connected to the first lower side at 1530. A second head tube assembly may be connected to the second lower side at 1540. A first portion of a first arm may be connected to the first head tube assembly at 1550. A second portion of the first arm may be connected to a first pivot connection of a support structure at 1560. A first portion of a second arm may be connected to the second head tube assembly at 1570. A second portion of the second arm may be connected to a second pivot connection of the support structure at 1580. At least one anti-skid wheel may be connected to the support structure at 1590. At least one suspension component may be attached to at least one of the following at 1595: the support structure, the first steer tube, the first head tube assembly, the second steer tube, the second head tube assembly, and a third steer tube. A third steer tube may be connected above the wheel to: an upper side of the first steer tube and an upper side of the second steer tube at 1596. At least one steer tube may be connected to at least one of the following at 1597: a handlebar, a wheel, a tiller, at least one handle, at least one pedal, at least one lever, at least one cable, at least one chain, and at least one pulley.

According to some of the various embodiments, an apparatus may comprise a first skirt shaped to cover at least a portion of a first side of a wheel. The apparatus may comprise at least one first connector. Each of the at least one first connector may be attached to at least one first upper portion of the first skirt. Each of the at least one first connector may be configured to connect to at least a first portion of a fender. The apparatus may be distinct from the fender. The apparatus may be configured to be connected and removed from the fender. The first skirt may be flexible. The first skirt may be configured to connect to a first steer tube. The first skirt may be configured to connect to a first fork tube. The first skirt may be configured to connect to a frame. The at least one first connector may comprise a snap, a hook and loop fastener, a fender sleeve, a metal fastener, a magnet, combinations thereof, and/or the like. The first skirt may comprise at least one synthetic material, a leather material, at least one metal, fiberglass, carbon fiber, combinations thereof, and/or the like. Examples of a synthetic material include plastic and nylon. The first skirt may comprise embroidery, paint, at least one advertisement, combinations thereof, and/or the like. The first skirt may comprise at least one water and/or weather resistant coating.

According to some of the various embodiments, an apparatus may comprise a second skirt shaped to cover at least a portion of a second side of a wheel. The apparatus may comprise at least one second connector. Each of the at least one second connector may be attached to at least one second upper portion of the second skirt. Each of the at least one second connector may be configured to connect to at least a second portion of a fender. The apparatus may be distinct from the fender. The apparatus may be configured to be connected and removed from the fender. The second skirt may be flexible. The second skirt may be configured to connect to a second steer tube. The second skirt may be configured to connect to a second fork tube. The second skirt may be configured to connect to a frame. The at least one second connector may comprise a snap, a hook and loop fastener, a fender sleeve, a metal fastener, a magnet, combinations thereof, and/or the like. The second skirt may comprise at least one synthetic material, a leather material, at least one metal, fiberglass, carbon fiber, combinations thereof, and/or the like. The second skirt may comprise embroidery, paint, at least one advertisement, combinations thereof, and/or the like. The second skirt may comprise at least one water and/or weather resistant coating.

According to some of the various embodiments, an apparatus may comprise a skirt shaped to cover at least a portion of a fender. The skirt may be shaped to cover at least a portion of a first side of a wheel. The skirt may be shaped to cover at least a portion of a second side of the wheel. The apparatus may comprise at least one first connector. The at least one first connector may be attached to at least one first lower portion of the skirt on a first side of the wheel. The at least one first connector may be configured to attach to a first vehicle portion. The apparatus may comprise at least one second connector. The at least one second connector may be attached to at least one second lower portion of the skirt on a second side of the wheel. The at least one second connector may be configured to attach to a second vehicle portion. The first vehicle portion may comprise a first steer tube, a first fork tube, a frame, combinations thereof, and/or the like. The second vehicle portion may comprise a second steer tube, a second fork tube, a frame, combinations thereof, and/or the like. The apparatus may comprise at least one third connector. The at least one third connector may be attached to at least one fender portion of the skirt. The at least one third connector may be configured to connect to a fender.

According to some of the various embodiments, a skirt may be flexible. The skirt may comprise at least one of: synthetic material, leather, metal, fiberglass, carbon fiber, combinations thereof, and/or the like. The skirt may comprise embroidery, paint, at least one advertisement, combinations thereof, and/or the like. At least one first connector may comprise a snap, a hook and loop fastener, a metal fastener, a magnet, combinations thereof, and/or the like. At least one second connector may comprise a snap, a hook and loop fastener, a metal fastener, a magnet, combinations thereof, and/or the like. At least one third connector may comprise a snap, a hook and loop fastener, a metal fastener, a magnet, combinations thereof, and/or the like.

Figure 16:
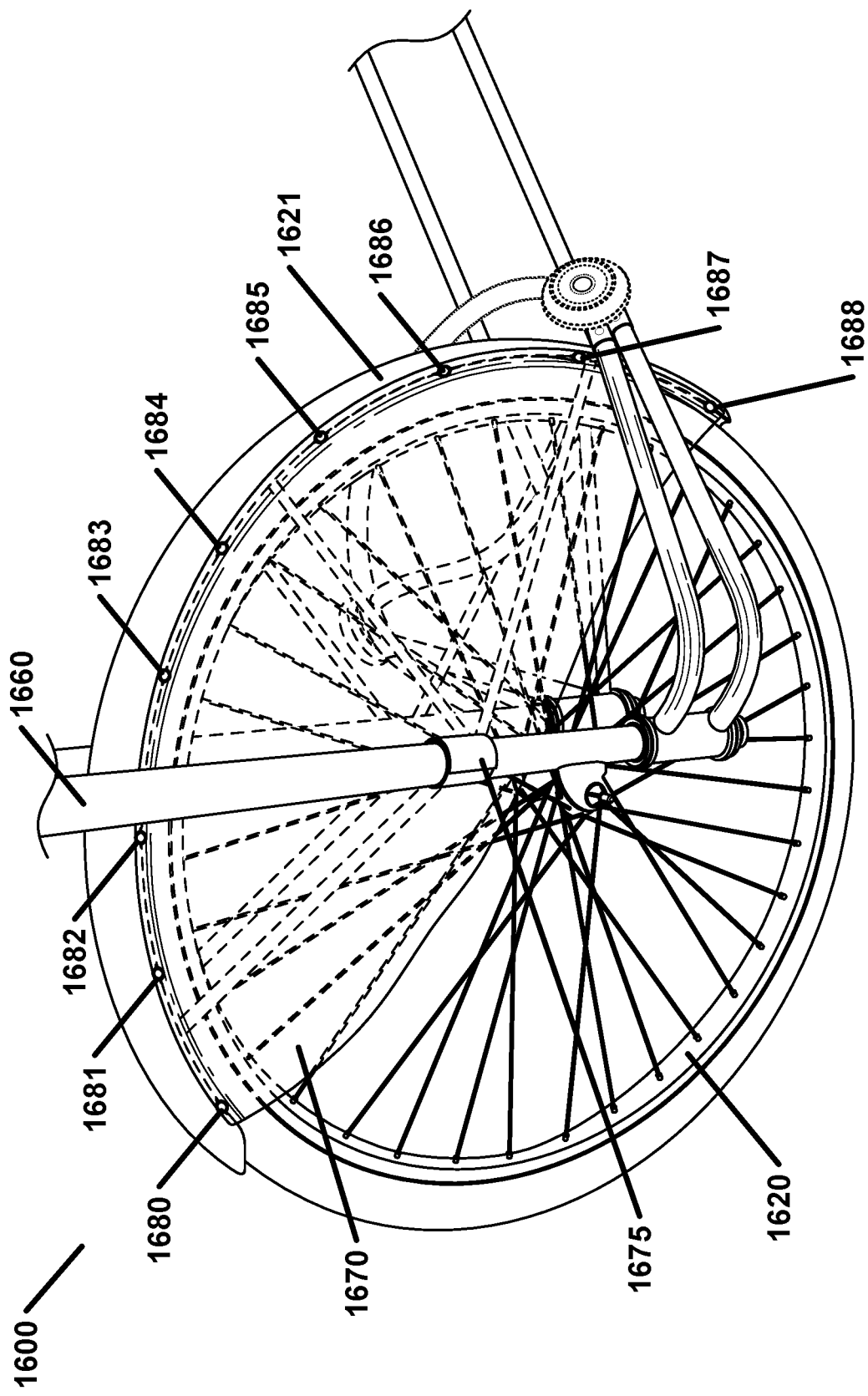
FIG. 16 is an illustration of an example under-axle steering assembly equipped with a fender and a skirt as per various aspects of various embodiments.

FIG. 16 is an illustration of an example under-axle steering assembly 1600 equipped with a fender 1621 and a first skirt 1670 as per various aspects of various embodiments. First skirt 670 may be shaped to cover at least a portion of a first side of a wheel 1620. At least one first connector (for example 1680, 1681, 1682, 1683, 1684, 1685, 1686, 1687, and 1688) may be attached to at least one first upper portion of first skirt 1670. The at least one first connector (for example 1680, 1681, 1682, 1683, 1684, 1685, 1686, 1687, and 1688) may be configured to connect to at least a first portion of fender 1621. First skirt 1670 may be configured to connect to a first steer tube 1660 through employment of connector 1675.

Figure 17:
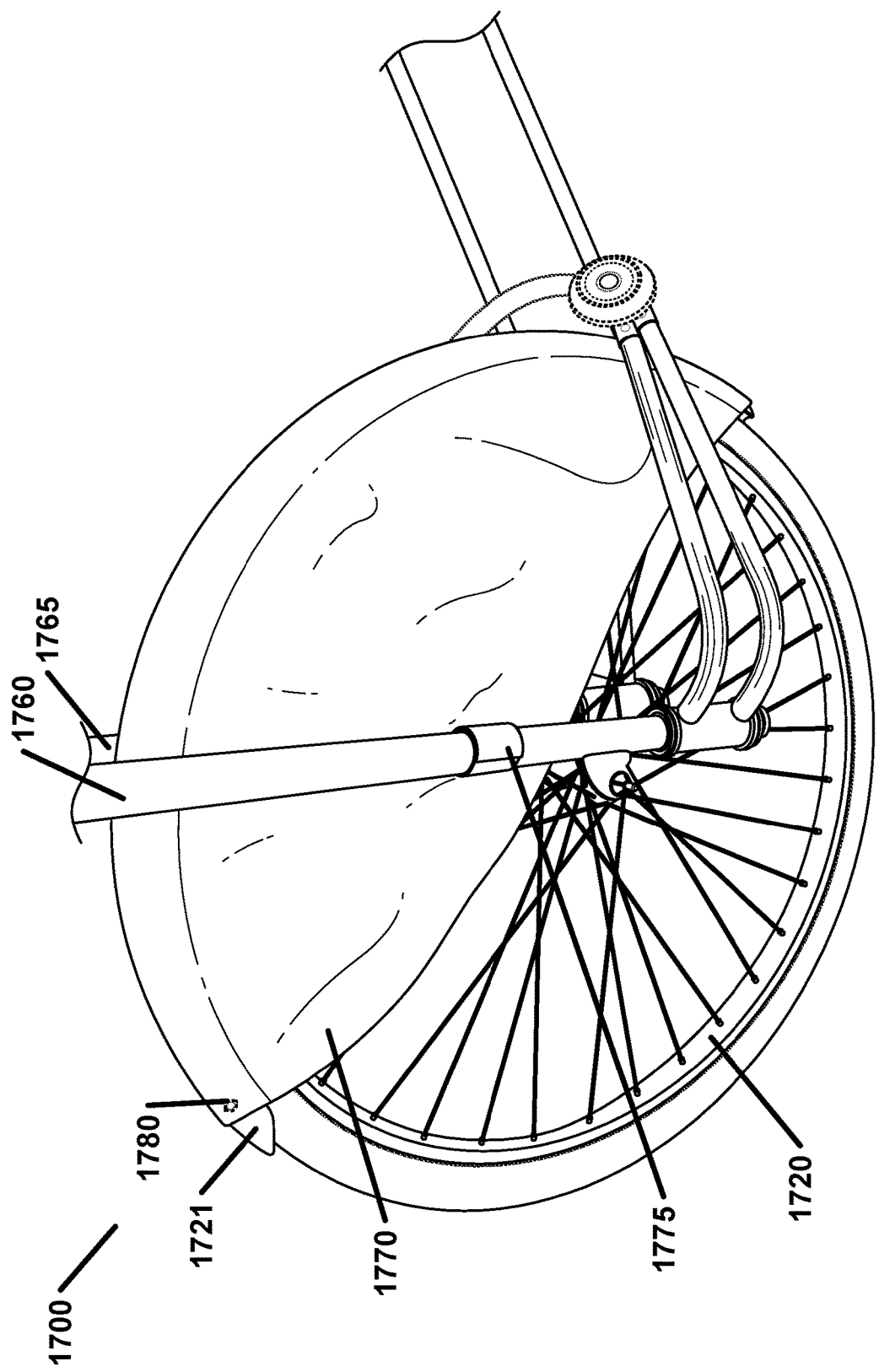
FIG. 17 is an illustration of an example under-axle steering assembly equipped with a fender and a skirt as per various aspects of various embodiments.

FIG. 17 is an illustration of an example under-axle steering assembly 1700 equipped with a fender 1721 and a skirt 1770 as per various aspects of various embodiments. Skirt 1770 may be shaped to cover at least a portion of a fender (for example 1721). Skirt 1770 may be shaped to cover at least a portion of a first side of a wheel 1720 and a second side (not shown) of the wheel 1720. At least one first connector (for example 1775) may be configured to connect to a first vehicle portion. The first vehicle portion may comprise first steer tube 1760. At least one second connector (not shown) may be configured to connect to a second vehicle portion. The second vehicle portion may comprise second steer tube 1765. At least one third connector (for example 1780) may be configured to connect to a fender (for example 1721).

Figure 18:
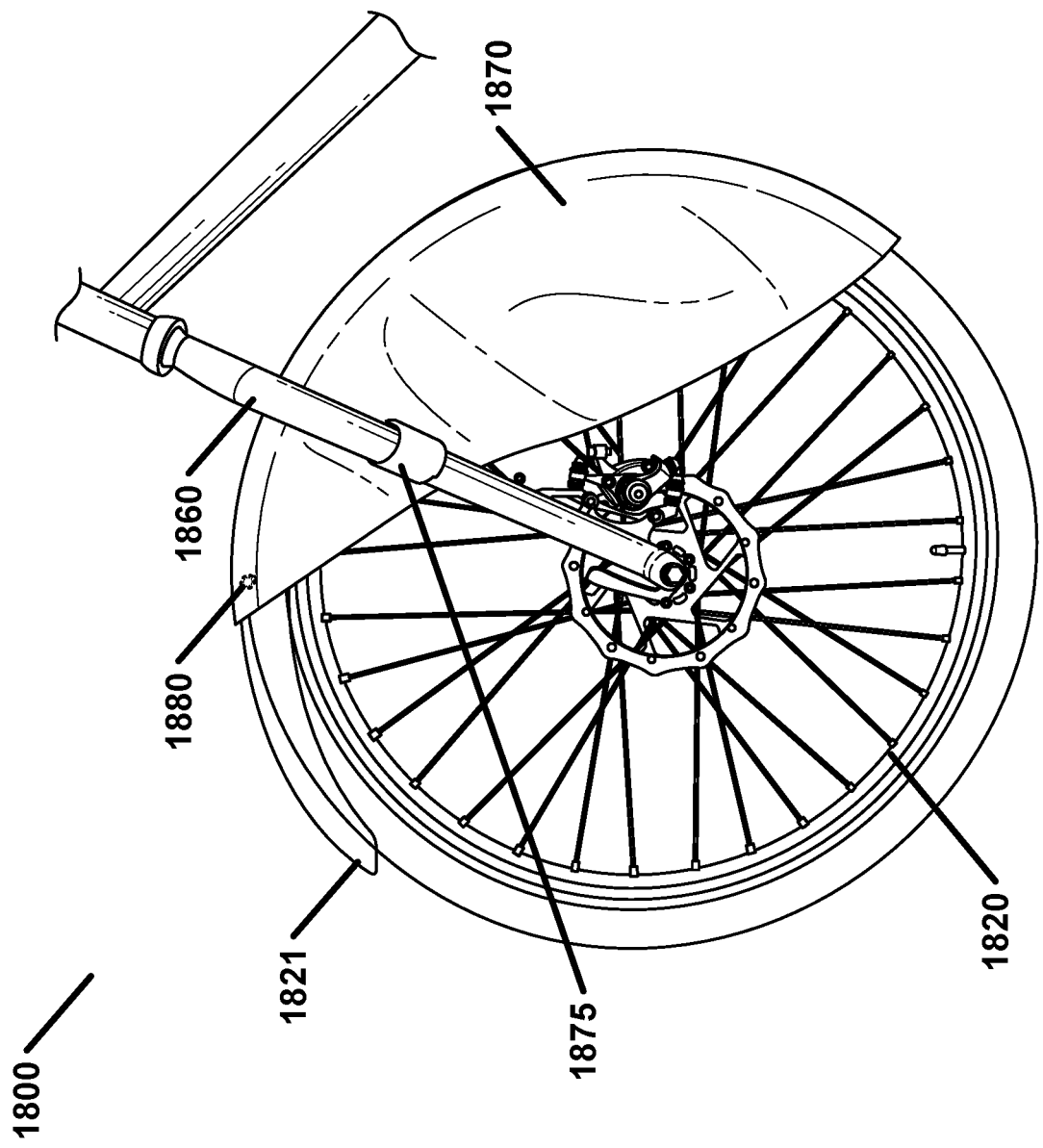
FIG. 18 is an illustration of an example bicycle equipped with a front wheel fender and a skirt as per various aspects of various embodiments.

FIG. 18 is an illustration of an example bicycle 1800 equipped with a front wheel fender 1821 and a skirt 1870 as per various aspects of various embodiments. Skirt 1870 may be shaped to cover at least a portion of a fender (for example 1821). Skirt 1870 may be shaped to cover at least a portion of a first side of a wheel 1820 and a second side (not shown) of the wheel 1820. At least one first connector (for example 1875) may be configured to connect to a first vehicle portion. The first vehicle portion may comprise first fork tube 1860. At least one second connector (not shown) may be configured to connect to a second vehicle portion. The second vehicle portion may comprise a second fork tube (not shown). At least one third connector (for example 1880) may be configured to connect to a fender (for example 1821).

Figure 19:
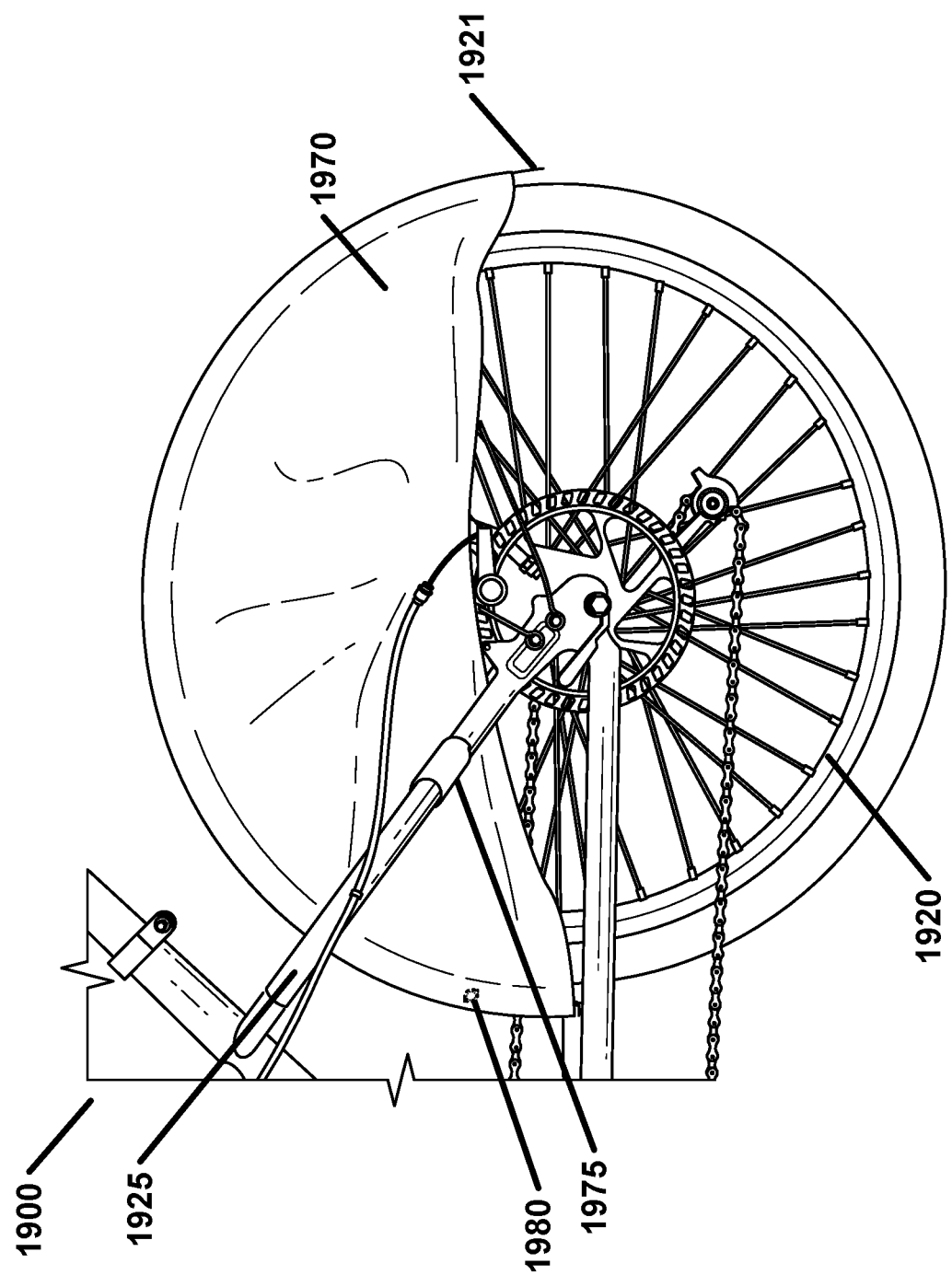
FIG. 19 is an illustration of an example bicycle equipped with a rear wheel fender and a skirt as per various aspects of various embodiments.

FIG. 19 is an illustration of an example bicycle 1900 equipped with a rear wheel fender 1921 and a skirt 1970 as per various aspects of various embodiments. Skirt 1970 may be shaped to cover at least a portion of a fender (for example 1921). Skirt 1970 may be shaped to cover at least a portion of a first side of a wheel 1920 and a second side (not shown) of the wheel 1920. At least one first connector (for example 1975) may be configured to connect to a first vehicle portion. The first vehicle portion may comprise a first portion of a frame (for example seat stay 1925). At least one second connector (not shown) may be configured to connect to a second vehicle portion. The second vehicle portion may comprise a second portion of a frame. At least one third connector (for example 1980) may be configured to connect to a fender (for example 1921).

According to different embodiments, various types of wheeled vehicles may be configured with a fender and a skirt. The previous examples are presented as illustrations of the possible wheeled vehicles which may be configured with at least one fender and at least one skirt. According to different embodiments, types of wheeled vehicles that may be configured with at least one fender and at least one skirt may include, but are not limited to: a scooter, a bicycle, a tandem, a sociable, a glide bike, a treadle bicycle, a treadle tricycle, an elliptical bicycle, an elliptical tricycle, a sideways bike, a prone bicycle, a tricycle, a trike, combinations thereof, and/or the like.

Although the subject matter has been described in language specific to structural features, it is to be understood that the subject matter defined in the appended claims is not necessarily limited to the specific features described above. Rather, the specific features described above are disclosed as example forms of implementing the claims.

In this specification, "a" and "an" and similar phrases are to be interpreted as "at least one" and "one or more." References to "an" embodiment in this disclosure are not necessarily to the same embodiment.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures that highlight any structure and/or shapes, are presented for example purposes only. The disclosed apparatus may be utilized in ways other than that shown.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. An apparatus comprising:
    a) a first steer tube having an upper side and a lower side, the upper side of the first steer tube configured for connection to a mechanism configured to at least steer a wheel;
    b) a first axle mounting structure configured to connect the lower side of the first steer tube to a first end of an axle assembly of the wheel;
    c) a second steer tube having an upper side and a lower side, the upper side of the second steer tube configured for connection to a mechanism configured to at least steer the wheel;
    d) a second axle mounting structure configured to connect the lower side of the second steer tube to a second end of the axle assembly;
    e) a first head tube assembly comprising a first head tube, the first head tube assembly configured to secure the lower side of the first steer tube in the first head tube, the entirety of the first head tube assembly lower than the top of the wheel;
    f) a second head tube assembly comprising a second head tube, the second head tube assembly configured to secure the lower side of the second steer tube in the second head tube, the entirety of the second head tube assembly lower than the top of the wheel;
    g) a support structure comprising a first pivot connection and a second pivot connection;
    h) a first arm connecting the first head tube and the first pivot connection; and
    i) a second arm connecting the second head tube and the second pivot connection.

2. The apparatus according to claim 1, further comprising a third steer tube connected to the upper side of the first steer tube and the upper side of the second steer tube above the wheel, the third steer tube comprising a height adjuster.

3. The apparatus according to claim 1, wherein the first head tube assembly and the second head tube assembly each comprise an upper bearing and a lower bearing.

4. The apparatus according to claim 1, wherein the support structure is disposed to at least one anti-skid wheel.

5. The apparatus according to claim 1, further comprising a frame connected to the support structure.

6. The apparatus according to claim 1, further comprising a platform connected to the support structure.

7. The apparatus according to claim 1, further comprising:
    a) a frame connected to the support structure; and
    b) a second wheel connected to the frame.

8. A method comprising:
    a) connecting a lower side of a first steer tube to a first axle mounting structure, the first axle mounting structure configured to connect to a first end of an axle assembly of a wheel, an upper side of the first steer tube configured for connection to a mechanism configured to at least steer the wheel;
    b) connecting a lower side of a second steer tube to a second axle mounting structure, the second axle mounting structure configured to connect to a second end of the axle assembly, an upper side of the second steer tube configured for connection to a mechanism configured to at least steer the wheel;
    c) connecting a first head tube assembly to the lower side of the steer tube, the first head tube assembly comprising a first head tube, the first head tube assembly configured to secure the lower side of the first steer tube in the first head tube, the entirety of the first head tube assembly lower than the top of the wheel;
    d) connecting a second head tube assembly to the lower side of the second steer tube; the second head tube assembly comprising a second head tube, the second head tube assembly configured to secure the lower side of the second steer tube in the second head tube, the entirety of the second head tube assembly lower than the top of the wheel;
    e) connecting a first portion of a first arm to the first head tube;
    f) connecting a second portion of the first arm to a first pivot connection of a support structure;
    g) connecting a first portion of a second arm to the second head tube; and
    h) connecting a second portion of the second arm to a second pivot connection of the support structure.

9. The method according to claim 8, further comprising connecting a third steer tube above the wheel to the upper side of the first steer tube and the upper side of the second steer tube.

10. The method according to claim 8, further comprising securing the lower side of the steer tube in the first head tube through employment of at least one of the following:
    a) a bearing race;
    b) a star nut;
    c) a bolt;
    d) a threaded rod;
    e) a nut;
    f) an expansion bolt;
    g) a threaded cap;
    h) a compression cap; and
    i) a compression nut.

11. The method according to claim 8, further comprising securing the lower side of the steer tube in the second head tube through employment of at least one of the following:
    a) a bearing race;
    b) a star nut;
    c) a bolt;
    d) a threaded rod;
    e) a nut;
    f) an expansion bolt;
    g) a threaded cap;
    h) a compression cap; and
    i) a compression nut.

12. The method according to claim 8, further comprising connecting at least one anti-skid wheel to the support structure.

13. The method according to claim 8, further comprising attaching a frame to the support structure.

14. The method according to claim 8, further comprising attaching a platform to the support structure.

* * * * *